(12) United States Patent
Donderici

(10) Patent No.: US 12,479,462 B2
(45) Date of Patent: Nov. 25, 2025

(54) RETROFIT VEHICLE COMPUTING SYSTEM TO OPERATE WITH MULTIPLE TYPES OF MAPS

(71) Applicant: GM Cruise Holdings LLC, San Francisco, CA (US)

(72) Inventor: Burkay Donderici, Burlingame, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 538 days.

(21) Appl. No.: 17/830,619

(22) Filed: Jun. 2, 2022

(65) Prior Publication Data
US 2023/0391358 A1    Dec. 7, 2023

(51) Int. Cl.
*B60W 60/00* (2020.01)
*G01C 21/00* (2006.01)
*G06V 20/58* (2022.01)

(52) U.S. Cl.
CPC ....... *B60W 60/001* (2020.02); *G01C 21/3815* (2020.08); *G01C 21/387* (2020.08); *G06V 20/582* (2022.01); *G06V 20/584* (2022.01); *B60W 2420/403* (2013.01)

(58) Field of Classification Search
CPC ......... B60W 60/001; B60W 2420/403; B60W 2050/0075; B60W 2556/40; B60W 2556/50; G01C 21/3815; G01C 21/387; G06V 20/582; G06V 20/584; G06V 10/806; G06V 10/82; G06V 20/56
See application file for complete search history.

(56) References Cited

U.S. PATENT DOCUMENTS

| | | | |
|---|---|---|---|
| 2018/0188045 A1* | 7/2018 | Wheeler | G06V 10/98 |
| 2019/0271554 A1* | 9/2019 | Colgate | G06V 30/274 |
| 2019/0323855 A1* | 10/2019 | Mahler | G01S 17/89 |
| 2020/0348145 A1* | 11/2020 | Paranjpe | G01C 21/3676 |
| 2021/0004021 A1* | 1/2021 | Zhang | G06T 19/00 |
| 2022/0306156 A1* | 9/2022 | Wray | G06V 20/588 |
| 2023/0349716 A1* | 11/2023 | Wang | G06N 3/0464 |

* cited by examiner

*Primary Examiner* — Anne Marie Antonucci
*Assistant Examiner* — Misa H Nguyen
(74) *Attorney, Agent, or Firm* — CANTOR COLBURN LLP

(57) ABSTRACT

Systems and methods for retrofitting a vehicle computing system dependent on a certain type of maps to operate with other type(s) of maps are provided. For example, a method performed by a vehicle may include receiving, from one or more sensors of the vehicle, first sensor data associated with a surrounding environment of the vehicle; receiving first map data of a first map type; and retrofitting a vehicle controller of the vehicle that is based on a second map type different from the first map type to operate on the first map data, where the retrofitting includes adapting the first map data using the first sensor data to generate second map data associated with the second map type; and determining, by the vehicle controller, an action for the vehicle based at least in part on the generated second map data.

17 Claims, 15 Drawing Sheets

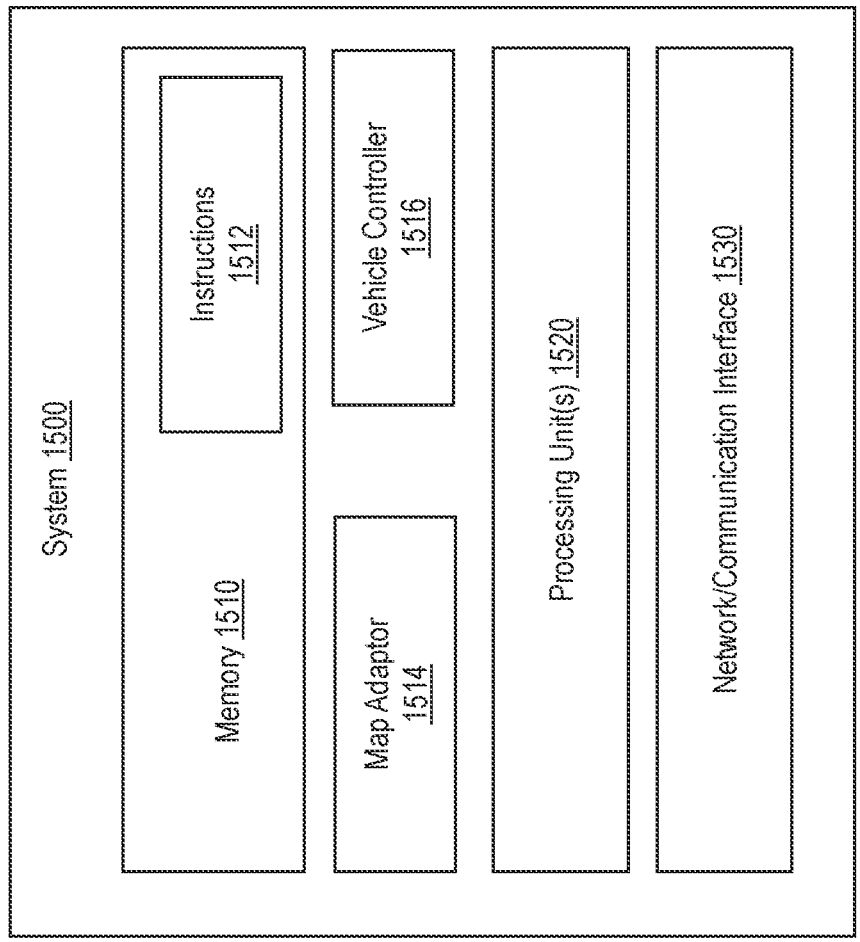

RETROFIT VEHICLE COMPUTING SYSTEM TO OPERATE WITH MULTIPLE TYPES OF MAPS

TECHNICAL FIELD

The present disclosure relates generally to autonomous vehicles, and more particularly, to retrofitting a vehicle computing system dependent on a certain type of maps to operate with other type(s) of maps.

BACKGROUND

Autonomous vehicles, also known as self-driving cars, driverless vehicles, and robotic vehicles, may be vehicles that use multiple sensors to sense the environment and move without human input. Automation technology in the autonomous vehicles may enable the vehicles to drive on roadways and to accurately and quickly perceive the vehicle's environment, including obstacles, signs, and traffic lights. Autonomous technology may utilize map data that can include geographical information and semantic objects (such as parking spots, lane boundaries, intersections, crosswalks, stop signs, traffic lights) for facilitating a vehicle in making driving decisions. The vehicles can be used to pick up passengers and drive the passengers to selected destinations. The vehicles can also be used to pick up packages and/or other goods and deliver the packages and/or goods to selected destinations.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 15 illustrates an exemplary computing system used in various embodiments of the present disclosure.

DETAILED DESCRIPTION

Overview

Figure 1:
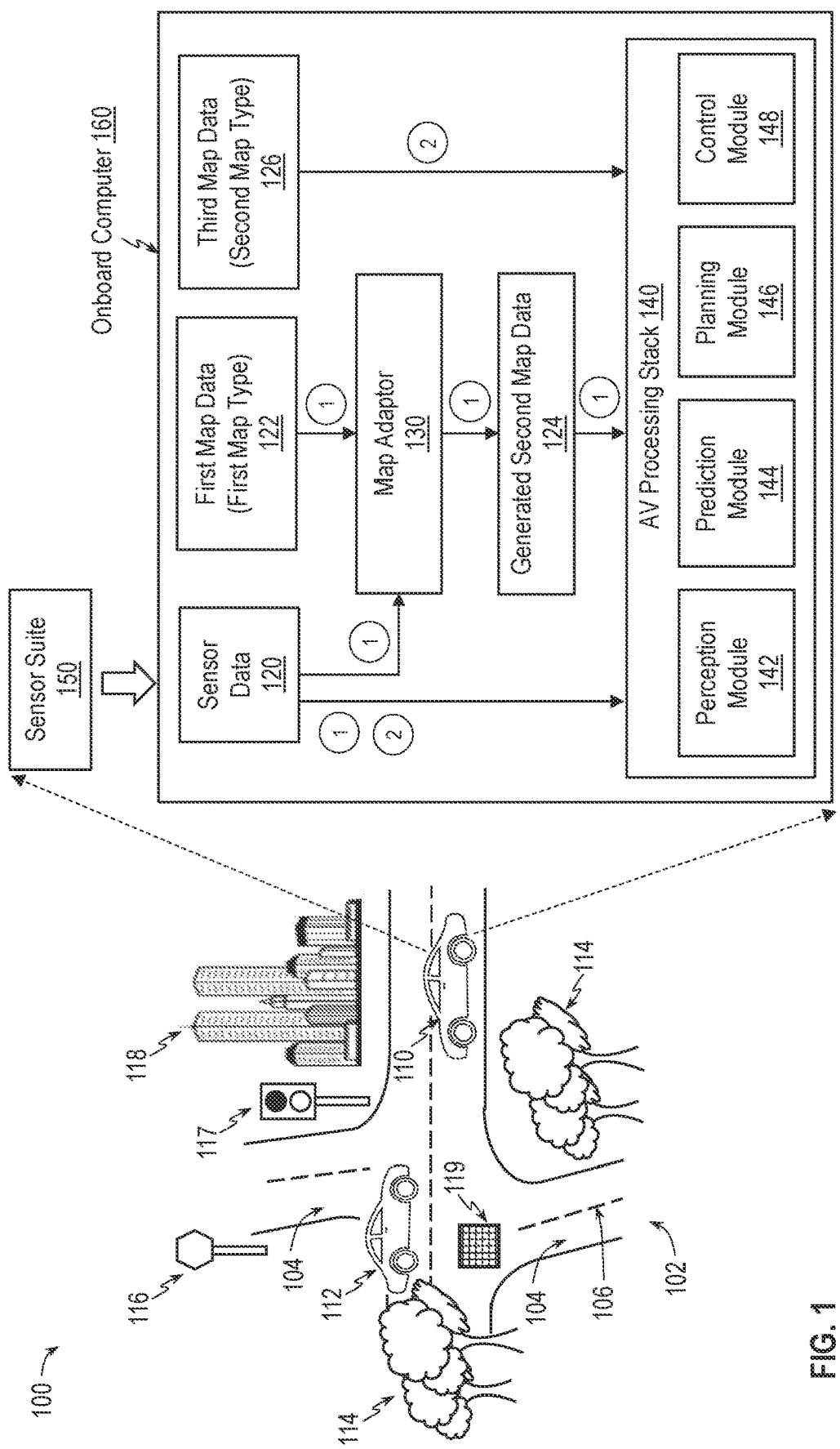
FIG. 1 provides an illustration of an exemplary autonomous driving scenario in which an autonomous vehicle (AV) computing system is adapted to process multiple types of maps, according to some embodiments of the present disclosure.

The systems, methods and devices of this disclosure have several innovative aspects, no one of which is solely responsible for the attributes disclosed herein. Details of one or more implementations of the subject matter described in this specification are set forth in the description below and the accompanying drawings.

Autonomous vehicles (AVs) can provide many benefits. For instance, AVs may have the potential to transform urban living by offering opportunity for efficient, accessible and affordable transportation. An AV may be equipped with various sensors to sense an environment surrounding the AV and collect information (e.g., sensor data) to assist the AV in making driving decisions. To that end, the collected information or sensor data may be processed and analyzed to determine a perception of the AV's surroundings, extract information related to navigation, and predict future motions of the AV and/or other traveling agents in the AV's vicinity. The predictions may be used to plan a path for the AV (e.g., from point A to point B). As part of planning, the AV may access map information and localize itself based on location information (e.g., from location sensors) and the map information. Subsequently, instructions can be sent to a controller to control the AV (e.g., for steering, accelerating, decelerating, braking, etc.) according to the planned path.

Unlike conventional maps or standard maps in which representations of roadways in a geographical area is provided for navigation purposes, the maps that are particularly built for autonomous driving purposes may have a higher precision (or accuracy), for example, at a centimeter-level instead of a meter-level accuracy offered by standard maps. Map accuracy can be categorized into global accuracy and local accuracy. Global accuracy may refer to positioning of a feature on the surface of the earth. Local accuracy may refer to positioning of a feature in relation to road elements around it. These high-precision or high-accuracy maps may be referred to as high-definition (HD) maps. An HD map may provide not only representations of roadways with a high-precision or high-accuracy but may also include map elements or road elements related to traffic lights, road signs, lane markings, road arrows, road edges, drivable lanes, non-drivable lanes or areas, crosswalks, traffic rules, real-time traffic information, etc. in the geographical area represented by the map. For instance, a representation (e.g., an image or a symbol) of a road element may be placed in the map at a location corresponding to the location of the actual physical road element in the real physical world. Additionally, semantics or labels may be included as part of the representation in the map. Furthermore, an HD map may provide a precise three-dimensional (3D) representation of a scene. The accuracies, the additional information, and the 3D representations provided by HD maps can assist an AV in making better driving decisions.

In certain examples, AV systems, processing stacks, and/or algorithms (e.g., related to perception, prediction, motion planning, and/or control) may be designed, developed, trained, optimized, and/or tested using HD maps as inputs. However, HD maps may be unavailable or out-of-date for some geographical areas due to the time-consuming and costly process in creating and maintaining these HD maps. Accordingly, it may be desirable for an AV to be able to operate with HD maps as well as other less-informational, less-accuracy maps (e.g., standard maps, non-HD maps). However, it may be expensive and complex to maintain both an HD map-based computing system and a non-HD map-based computing system at a vehicle. Accordingly, the present disclosure provides mechanisms for retrofitting a vehicle system dependent on a certain type of maps (e.g., HD maps) to operate with other type(s) of maps (e.g., standard maps).

As used herein, a map type may generally refer to a set of attributes or features, which may include a map accuracy, a map resolution (e.g., a spatial resolution, a spectral resolution, and/or a temporal resolution), roadside object information (e.g., including traffic lights, road signs, lane markings, road arrows, road edges, drivable lanes, non-drivable lanes or areas, crosswalks, etc.), geographical and/or geometric information about roadways, traffic rules, and/or real-time traffic information. As used herein, generated or synthesized map data may refer to map data that is generated from one type of map data to simulate another type of map data.

According to an aspect of the present disclosure, a vehicle (e.g., an AV) may receive first map data including a representation of a geographical area surrounding the vehicle. The first map data may be of a first map type while the vehicle may include a vehicle controller designed, developed, trained, optimized, and/or tested to operate on map data of a second map type that is different from the first map type. For instance, the second map type has a richer or fuller set of attributes than the first map type. That is, the second map type may include at least one attribute that is absent from the first map type. More generally, the second map type is more informational than the first map type and/or is an improvement to the first map type. In a certain example, the second map type may correspond to an HD map, and the first map type may correspond to a standard or non-HD map as discussed above. A non-HD map may also be referred to as a low-definition (LD) map in the present disclosure.

To retrofit the vehicle system (the vehicle controller) dependent on the second map type to operate with the first map data of the first map type, the vehicle may leverage information sensed by its sensors. For example, the vehicle may receive first sensor data from one or more sensors of the vehicle. The one or more sensors can include camera sensors, location sensors, light detection and ranging (LIDAR) sensors, radio detection and ranging (RADAR) sensors, etc. The first sensor data may provide information (e.g., images and/or point clouds) associated with a surrounding environment of the vehicle. The vehicle may dynamically adapt the first map data using the received first sensor data to generate second map data associated with the second map type. For instance, the generated second map data is of a third map type corresponding to a simulated or synthesized second map type. The vehicle may utilize the vehicle controller to determine an action (e.g., a driving decision) for the vehicle based at least in part on the generated second map data. In other words, the vehicle controller can be configured to process third map data of the second map type (e.g., to determine at least one of a perception, a prediction, a plan, and/or a control for the vehicle) and be reused to process the generated second map data (adapted from the first map data of the first map type).

In some aspects, the adapting the first map data may be responsive to a lack of availability of map data of the second map type for the geographical area surrounding the vehicle. In other aspects, there may be fourth map data of the second map type available for the geographical area, but the fourth map data may have a lower quality than the first map data. Accordingly, the adapting the first map data may be responsive to a comparison between a quality of the first map data of the first map type and a quality of fourth map data of the second map type for the geographical area surrounding the vehicle and a determination that the fourth map data of the second map type has a lower quality than the first map data of the first map type.

In some aspects, as part of adapting the first map data, the vehicle may determine, based on the sensor data, at least one object (e.g., traffic lights, road signs, road markings, buildings, trees, barriers, etc.) associated with the second map type that is present in the surrounding environment of the vehicle and absent in the first map data. The vehicle may further generate the second map data by rendering the at least one determined object on to the first map data.

In some aspects, as part of adapting the first map data, the vehicle may generate composite map data from the first map data and fourth map data, where the fourth map data may be generated earlier based on fifth map data of the first map type and second sensor data different from the first sensor data. The vehicle may further determine at least one reference object by performing at least one of perception, prediction, planning, or control using the composite map data and the first sensor data. The vehicle may further generate the second map data using the first map data and the at least one reference object.

In some aspects, as part of adapting the first map data, the vehicle may generate multiple possibilities of map data based on the first map data and the first sensor data and may select one of the multiple possibilities of map data to generate the second map data. In other aspects, as part of adapting the first map data, the vehicle may generate the second map data by generating multiple possibilities of map data based on the first map data and the first sensor data. Further, as part of determining the action for the vehicle, the vehicle may process each of the multiple possibilities of map data separately to generate a respective prediction and may determine a plan for the vehicle based on a combination of at least some of the predictions and respective prediction confidence levels.

In some aspects, as part of determining the action for the vehicle, the vehicle may process the first map data and the first sensor data to determine at least one of a first perception, a first prediction, a first plan, or a first control for the vehicle and may process the generated second map data and the first sensor data to determine at least one of a second perception, a second prediction, a second plan, or a second control for the vehicle. The vehicle may further compare the at least one of the first perception, the first prediction, the first plan, or the first control (determined based on the first map data and the first sensor data) against the at least one of the second perception, the second prediction, the second plan, or the second control (determined based on the generated second map data and the first sensor data). The vehicle may further determine the action for the vehicle responsive to the comparison.

In some aspects, the vehicle may utilize a machine learning (ML) model to process the sensor data and the first map data of the first map type to generate the second map data of the second map type. In some examples, the ML model can be trained using a generative adversarial network (GAN) model.

ML algorithms use computational methods to learn information directly from data without relying on a predetermined equation as a model. The algorithms may adaptively improve their performance as the number of samples available for learning increases. As used herein, an ML model is a model trained to find patterns or make a prediction from new data or unseen data, where the training is based on a large set of training data. In some examples, an ML model may be a neural network including a plurality of layers, for example, an input layer, followed by one or more hidden layers (e.g., fully-connected layers, convolutional layers, and/or pooling layers) and an output layer. Each layer may include a set of weights and/or biases that can transform inputs received from a previous layer and the resulting outputs can be passed to the next layer. The weights and/or biases in each layer can be trained and adapted, for example, to perform certain predictions. An ML model can have any suitable architecture (e.g., a convolutional neural network, a recurrent neural network, a generative network, a discriminator network, etc.).

In an additional aspect of the present disclosure, a vehicle (e.g., an AV) may receive first map data representative of a geographical area surrounding the vehicle, where the first map data may be of a first map type or a second map type different from the first map type. The vehicle may include a vehicle controller (e.g., to perform perception, prediction, planning, control, etc.) designed, developed, trained, optimized, and/or tested to operate on map data of the second map type. The vehicle may process the first map data using an ML model to generate second map data associated with the second map type. The second map data may include a first feature that is absent from the first map data. Additionally or alternatively, the second map data may include a second feature that has a different representation (e.g., different resolution and/or different accuracy) than in the first map data. The vehicle may utilize the vehicle controller to determine an action (e.g., a driving decision) for the vehicle based on the second map data. In some aspects, the ML model may be a generator model that is trained jointly with a discriminator model in a GAN model.

In a further aspect of the present disclosure, a computer-implemented system may train an ML model for map adaptation based on input map data and target map data associated with a geographical area. The target map data may include at least one additional feature in the geographical area that is absent from the input map data. For example, the input map data may have a missing portion or a hole in its representation of the geographical area. Additionally or alternatively, the target map data may have a different representation (e.g., map resolution or accuracy) of the geographical area than the input data. As part of training, the computer-implemented system may process the input map data using the ML model to generate second map data and may update the ML model based on the generated second map data (synthesized map data), the target map data, and one or more criteria associated with a driving decision. For instance, the one or more criteria may be associated with a map statistical measure (e.g., frequency spectra, average color, average brightness, density of information, entropy, etc.) and/or a performance (e.g., run-time performance, a response time, a driving score) of the vehicle. In some aspects, the ML model may be a GAN model including a generator and a discriminator, where the discriminator and/or a loss function may be modified to account for the one or more criteria associated with the driving decision.

The systems, schemes, and mechanisms described herein can advantageously enable a vehicle (e.g., AV) to utilize a single processing system (e.g., an AV processing stack) to operate with multiple different map types (e.g., HD maps and non-HD maps) through real-time (dynamic) map adaptation. The utilization of a single processing system at the vehicle can simplify design, manufacturing, maintenance, and/or production of the vehicle, and thus can reduce cost and time to market in producing the vehicle.

Example Autonomous Driving Scenario in which an AV Supports Multiple Map Data Types FIG. 1 provides an illustration of an exemplary autonomous driving scenario 100 in which an AV computing system is adapted to process multiple types of maps, according to some embodiments of the present disclosure. As shown in FIG. 1, the scenario 100 may include an AV 110 driving on a roadway system 102. The roadway system 102 may include roads and lanes 104 and road markings 106. Other vehicles such as a vehicle 112 may also be driving on the roadway system 102. As further shown in FIG. 1, the scenario 100 may include trees 114, a road sign 116, a traffic light 117, buildings 118, and an object 119 (e.g., an obstacle, a road barrier, a traffic cone, etc.) located around the roadway system 102. In general, the scenario 100 may include various roadside objects (e.g., moving objects and/or stationary objects) at various locations.

The AV 110 may be a fully autonomous vehicle or a semi-autonomous vehicle. A fully autonomous vehicle may make driving decisions and drive the vehicle without human inputs. A semi-autonomous vehicle may make at least some driving decisions without human inputs. In some examples, the AV 110 may be a vehicle that switches between a semi-autonomous state and a fully autonomous state and thus, the AV 110 may have attributes of both a semi-autonomous vehicle and a fully autonomous vehicle depending on the state of the vehicle.

The AV 110 may include a sensor suite 150 and an onboard computer 160. The sensor suite 150 may include a wide variety of sensors, which may broadly categorize into a computer vision ("CV") system, localization sensors, and driving sensors. As an example, the sensor suite 150 may include one or more cameras. The one or more cameras may capture images of the surrounding environment of the AV 110. For instance, the one or more cameras may capture images of at least some of the trees 114, the road sign 116, the traffic light 117, the buildings 118, and the object 119 located around the roadway system 102. In some instances, the sensor suite 150 may include multiple cameras to capture different views, e.g., a front-facing camera, a back-facing camera, and side-facing cameras. In some instances, one or more cameras may be implemented using a high-resolution imager with a fixed mounting and field of view. One or more cameras may have adjustable field of views and/or adjustable zooms. In some embodiments, the cameras may capture images continually or at some intervals during operation of the AV 110. The cameras may transmit the captured images to the onboard computer 160 of the AV 110 for further processing, for example, to assist the AV 110 in determining certain action(s) to be carried out by the AV 110.

Additionally or alternatively, the sensor suite 150 may include one or more LIDAR sensors. The one or more LIDAR sensors may measure distances to objects in the vicinity of the AV 110 using reflected laser light. The one or more LIDAR sensors may include a scanning LIDAR that provides a point cloud of the region scanned. The one or more LIDAR sensors may have a fixed field of view or a dynamically configurable field of view. The one or more LIDAR sensors may produce a point cloud (e.g., a collection of data points in a 3D space) that describes the shape, contour, and/or various characteristics of one or more object in the surrounding of the AV 110 and a distance of the object away from the AV 110. For instance, the point cloud may include data points representing at least some of the trees 114, the road sign 116, the traffic light 117, the buildings 118, and the object 119 located around the roadway system 102. The one or more LIDAR sensors may transmit the captured point cloud to the onboard computer 160 of the AV 110 for further processing, for example, to assist the AV 110 in determining certain action(s) to be carried out by the AV 110.

Additionally or alternatively, the sensor suite 150 may include one or more RADAR sensors. RADAR sensors may operate in substantially the same way as LIDAR sensors, but instead of the light waves used in LIDAR sensors, RADAR sensors use radio waves (e.g., at frequencies of 24, 74, 77, and 79 gigahertz (GHz)). The time taken by the radio waves to return from the objects or obstacles to the AV 110 is used for calculating the distance, angle, and velocity of the obstacle in the surroundings of the AV 110.

Additionally or alternatively, the sensor suite 150 may include one or more location sensors. The one or more location sensors may collect data that is used to determine a current location of the AV 110. The location sensors may include a global positioning system (GPS) sensor and one or more inertial measurement units (IMUs). The one or more location sensors may further include a processing unit (e.g., a component of the onboard computer 160, or a separate processing unit) that receives signals (e.g., GPS data and IMU data) to determine the current location of the AV 110. The location determined by the one or more location sensors can be used for route and maneuver planning. The location may also be used to determine when to capture images of a certain object. The location sensor may transmit the determined location information to the onboard computer 160 of the AV 110 for further processing, for example, to assist the AV 110 in determining certain action(s) to be carried out by the AV 110.

In general, the sensor suite 150 may include any suitable sensors including but not limited to, photodetectors, one or more cameras, RADAR sensors, sound navigation and ranging (SONAR) sensors, LIDAR sensors, GPS, wheel speed sensors, weather sensors, IMUs, accelerometers, microphones, strain gauges, pressure monitors, barometers, thermometers, altimeters, etc. Further, the sensors may be located in various positions in and around the AV 110.

The onboard computer 160 may include one or more processors, memory, communication interface, for example, similar to the system 1500 of FIG. 15. In an example, the onboard computer 160 may receive sensor data 120 from one or more of the sensors in the sensor suite 150 and may store the sensor data 120 at a memory of the onboard computer 160. As shown in FIG. 1, the onboard computer 160 may implement an AV processing stack 140. The AV processing stack 140 may be implemented using a combination of hardware and/or software components. In certain embodiments, the AV processing stack 140 may be a software stack executed by the one or more processors. As further shown in FIG. 1, the AV processing stack 140 may include a perception module 142, a prediction module 144, a planning module 146, and a control module 148. In alternative configurations, fewer, different and/or additional components may be included in the onboard computer 160. For example, components such as map database(s) for assisting the AV 110 in making driving decisions and other vehicle functions are not shown in FIG. 1. In some instances, the AV processing stack 140 may be implemented by a vehicle controller (e.g., the controller 34 of FIG. 14 and/or the vehicle controller 1516 of FIG. 15). Further, functionality attributed to one component of the onboard computer 160 may be accomplished by a different component included in the onboard computer 160 or a different system from those illustrated.

The perception module 142 may analyze the sensor data 120 (e.g., camera images, point clouds, location information, etc.) provided by the sensor suite 150 and output an understanding or a perception of the environment surrounding the AV 110. In particular, the perception module 142 may extract information related to navigation and making driving decisions. For instance, the perception module 142 may detect objects such as other cars, pedestrians, trees, bicycles, and objects traveling on or near the roadway systems 102 on which the AV 110 is traveling, and indications surrounding the AV 110 (such as construction signs, traffic cones, traffic lights, stop indicators, and other street signs). In the illustrated example of FIG. 1, the perception module 142 may detect one or more of the vehicle 112, the trees 114, the road sign 116, the traffic light 117, the buildings 118, and/or the objects 119 in the surroundings of the AV 110. In some examples, the perception module 142 may include one or more classifiers trained using ML to identify particular objects. For example, a multi-class classifier may be used to classify each object in the environment of the AV 110 as one of a set of potential objects, e.g., a vehicle, a pedestrian, or a cyclist. As another example, a pedestrian classifier may recognize pedestrians in the environment of the AV 110, a vehicle classifier may recognize vehicles in the environment of the AV 110, etc.

The prediction module 144 may perform predictive analysis on at least some of the recognized objects, e.g., to determine projected pathways of other vehicles, bicycles, and pedestrians. The prediction module 144 may also predict the AV 110's future trajectories, which may enable the AV 110 to make appropriate navigation decisions. In some examples, the prediction module 144 may include one or more prediction models trained using ML to determine future motions and/or trajectories of other traffic agents and/or of the AV 110 itself.

The planning module 146 may plan maneuvers for the AV 110 based on map data, data received from the perception module 142, prediction information received from the prediction module 144, and navigation information, e.g., a route instructed by a fleet management system. In some examples, the planning module 146 may receive map data from a map database (e.g., stored locally at the AV 110 or at a remote server) including data describing roadways such as the roadway system 102 (e.g., locations of roadways, connections between roadways, roadway names, speed limits, traffic flow regulations, toll information, etc.), buildings such as the buildings 118 (e.g., locations of buildings, building geometry, building types), and other objects (e.g., location, geometry, object type). In some instances, the map database may further include data describing other features, such as bike lanes, sidewalks, crosswalks, traffic lights, parking lots, etc. In general, a map database may include data describing any known, relatively fixed features and/or objects in a geographical area. In some examples, the planning module 146 may receive data from the perception module 142 describing at least some of the features described by the map data in the environment of the AV 110. The planning module 146 may compare map data with data from the perception module 142 to confirm the accuracy of the map data and to determine the precise positions of perceived objects on the map.

The planning module 146 may determine a pathway for the AV 110 to follow. When the perception module 142 detects moving objects in the environment of the AV 110, the planning module 146 may determine the pathway for the AV 110 based on predicted behaviors of the objects provided by the prediction module 144 and right-of-way rules that regulate behavior of vehicles, cyclists, pedestrians, or other objects. The pathway may include locations for the AV 110 to maneuver to, and timing and/or speed of the AV 110 in maneuvering to the locations.

The control module 148 may send appropriate commands to instruct movement-related subsystems (e.g., actuators, steering wheel, throttle, brakes, etc.) of the AV 110 to maneuver according to the pathway determined by the planning module 146.

According to aspects of the present disclosure, the AV 110 may receive first map data 122 of a first map type while the AV processing stack 140 may include algorithms and/or software designed, developed, trained, optimized, and/or tested based on a second map type different than the first map type. As discussed above, a map type may generally refer to a set of attributes or features, which may include a map accuracy, a map resolution, roadside object information (e.g., including traffic lights, road signs, lane markings, road arrows, road edges, drivable lanes, non-drivable lanes or areas, crosswalks, etc.), geographical and/or geometric information about roadways, traffic rules, and/or real-time traffic information. For instance, the second map type may have a fuller set of attributes than the first map type. Stated differently, the second map type may include at least one attribute that is absent from the first map type. As an example, the first map type may be an LD map type (a standard map type or a non-HD map type) and the second map type may be an HD map type. As discussed above, HD maps may provide representations of a geographical area with a high-resolution, a high-accuracy (e.g., at a centimeter-level), various roadside information (e.g., parking spots, lane boundaries and markings, intersections, crosswalks, road signs, traffic lights, traffic cones, etc.), traffic rules, and/or real-time traffic information associated with the geographical area to assist autonomous driving. On the other hand, LD maps may include representations of roadways in the geographical area but may include less or none of the roadside, traffic rules, and/or real-time traffic information as in the HD maps and may have a lower map accuracy (e.g., at about a meter-level) than the HD maps.

To avoid maintaining multiple AV processing stacks at the AV 110, for example, one stack for processing map data of the first map type and another stack for processing map data of the second map type, the onboard computer 160 may further include a map adaptor 130. The map adaptor 130 may be implemented using a combination of hardware and/or software components. In certain embodiments, the map adaptor 130 may be a software component executed by the one or more processors of the onboard computer 160. The map adaptor 130 may adapt map data of the first map type to map data similar to the second map type. In this way, the same AV processing stack 140 that relies on the second map type can be reused for processing the adapted map data (e.g., generated or synthetic map data).

In the illustrated example of FIG. 1, the arrows marked with circles having a numeral 1 are associated with a processing flow at the onboard computer 160 during a first time period (or in a first environment) and the arrows marked with circles having a numeral 2 are associated with a processing flow at the onboard computer 160 during a second, different time period (or in a second, different environment). As shown, during the first time period, the onboard computer 160 may receive first sensor data, which is part of the sensor data 120. The onboard computer 160 may further receive first map data 122 of the first map type. The map adaptor 130 may adapt the first map data 122 of the first map type to second map data 124 associated with the second map type. To that end, the map adaptor 130 may perform map adaptation using the first sensor data sensed by sensor(s) of the sensor suite 150 and/or location information related to the AV 110 (e.g., received from the sensor suite 150) to generate the second map data 124. For instance, the generated second map data 124 may be of a third map type corresponding to a synthetic second map type. As an example, the first map data 122 may include basic roadway information (e.g., geographical locations of the roads and lanes 104, connections of the roads and lanes 104) related to the roadways system 102, and the generated second map data 124 may include roadside objection information (e.g., locations and representations of at least some of the trees 114, the road sign 116, the traffic light 117, the buildings 118, and the object 119) in addition to the basic roadway information. The second map data 124 output by the map adaptor 130 may be provided to the AV processing stack 140. The AV processing stack 140 may determine an action (e.g., a driving decision) to be carried out by the AV 110 using the first sensor data and the generated second map data 124. The action may be associated with perception, prediction, planning, and/or control operations as discussed above. Mechanisms for adapting the first map data 122 of the first map type to the second map data 124 of the synthetic second map type using the sensor data 120 will be discussed more fully below with reference to FIGS. 2-6.

As further shown in FIG. 1, during the second time period, the AV 110 (or the onboard computer 160) may receive second sensor data, which may be part of the sensor data 120. The AV 110 may further receive third map data 126 of the second map type (e.g., from a locally stored map database or a remote map database). Because the third map data 126 is of the second map type, the AV processing stack 140 may process the third map data 126 directly (without adaptation). The AV processing stack 140 may determine an action (e.g., a driving decision) to be carried out by the AV 110 using the second sensor data and the received third map data 126. In other examples, the third map data 126 can also be processed by the map adaptor 130 (e.g., to improve or add a certain attribute or characteristic of map information) before processing by the AV processing stack 140. For instance, the third map data 126 may include a hole or a missing portion in the representation of an area (e.g., due to an unknown area, a new area, an area with an obstructed view from the sensors), and the map adaptor 130 can predict and generate map data for the hole or missing portion. Mechanisms for improving or filling in missing portion(s) in the third map data 126 of the second map type will be discussed more fully below with reference to FIGS. 2 and 6.

In some examples, the AV 110 may receive the first map data 122, and/or the third map data 126 from a local map database stored at a memory of the onboard computer 160 of the AV 110. In other instances, the AV 110 may receive the first map data 122, and/or the third map data 126 from a remote map database stored at a remote server. In yet other instances, the AV 110 may receive one of the first map data 122 or the third map data 126 from a local map database and the other one of the first map data 122 or the third map data 126 from a remote map database. In some examples, the map adaptor 130 may perform map adaptation on the first map data 122 and/or the third map data 126 as discussed herein in response to a request from the AV 110. For instance, the AV 110 may request access to map information for a certain area, and upon receiving map data for that area with a missing portion or missing feature(s) or map data of the first map type, the map adaptor 130 may be triggered to perform the map adaptation.

The first map data 122, the generated second map data 124, and the third map data 126 may store data describing roadways, buildings, and/or other objects in various formats. For example, map data for a geographical area may include but not limited to, vector data (e.g., point data described by x, y representing latitude and longitude information, line data, polygon data, etc.), raster or grid data (e.g., matrices of numbers describing e.g., elevation, population, herbicide use, etc.), images or pictures (e.g., remote sensing data or scans of maps or other photos), terrain dataset (e.g., built from LIDARs and point clouds), semantics and/or graphical representations of roadside objects. In certain examples, HD map data (e.g., the second map type) may include images of roadways, 2D data with height information to convey 3D information, 3D points mesh, etc. to represent a geographical area. In some examples, HD map may show curb-to-curb information with centimeter accuracy, road markings and geographical boundaries. HD map may have semantic information such as school zones, U-turn areas, pull-over areas, unmarked yield areas, bumps, night lighting conditions, drivable areas, crosswalks, lane boundaries, restricted lanes, parking spots, red curbs, potential drive paths, traffic lights, bike lanes, fire hydrant locations, medians. HD map may also have a dynamic layer that shows surrounding more transient objects such as parked cars, movable stands, etc. potentially obtained from sensors of other AVs which have been to the same area. map data is contained in many formats: surface intensity tiles, 3D tiles, semantic feature database. Semantic data may be rasterized into tiles for quick spatial lookups of semantic information. Map information may be stored at different zoom levels for UI apps.

Example Map Adaptation Implementations

Figure 2:
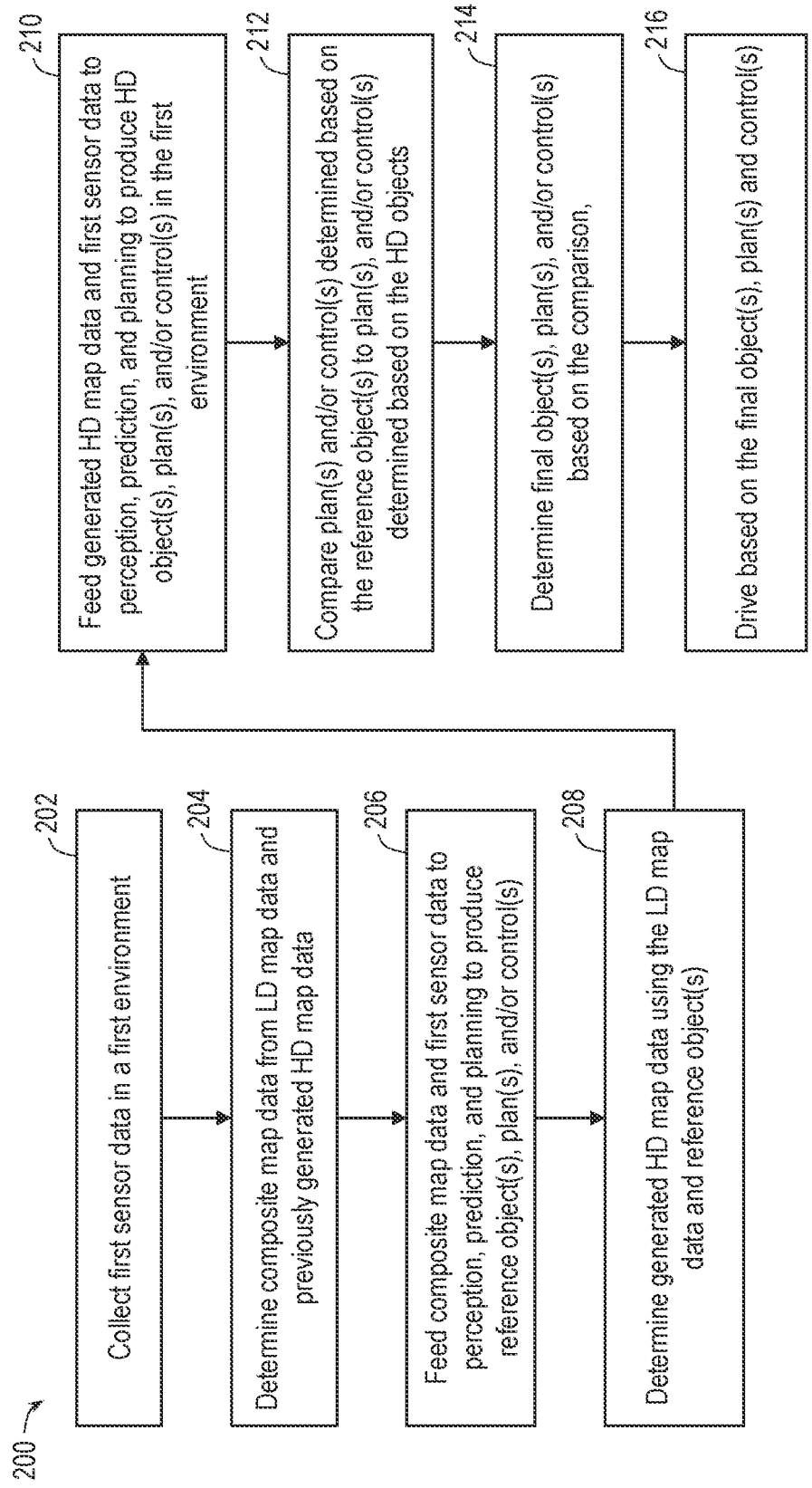
FIG. 2 is a flow diagram illustrating an exemplary process for map adaptation, according to some embodiments of the present disclosure.

FIGS. 2-6 are discussed in relation to FIG. 1 to illustrate various example map adaptation implementations. FIG. 2 is a flow diagram illustrating an exemplary process 200 for map adaptation, according to some embodiments of the present disclosure. For instance, the onboard computer 160 (or the map adaptor 130) of the AV 110 shown in FIG. 1 may implement the process 200 to adapt the first map data 122 of the first map type to generate the second map data 124 associated with the second map type for processing by the AV processing stack 140. In general, the process 200 may be performed using any suitable hardware components and/or software components. Operations are illustrated once each and in a particular order in FIG. 2, but the operations may be performed in parallel, reordered, and/or repeated as desired. Further, the process 200 may refer to the first map type discussed herein as an LD map type and the second map type discussed herein as an HD map type.

As shown, at 202, the AV 110 may collect first sensor data in a first environment, where the first sensor may be part of the sensor data 120 as discussed above with reference to FIG. 1.

At 204, the AV 110 may determine composite map data from LD map data and previously generated HD map data. For instance, the AV 110 may receive LD map data (e.g., the first map data 122 of the first map type) from a local map database or a remote map database. The LD map data may include a representation of a geographical area surrounding the AV 110. The AV 110 may also have access to the previously generated HD map data, for example, generated based on another LD map and sensor data collected at an earlier time.

At 206, the AV 110 may feed the composite map data and the first sensor data to perception, prediction, and planning to produce reference object(s), plan(s), and/or control(s). For instance, the AV 110 may input the composite map data and the first sensor data to AV processing stack 140, for example, for processing by the perception module 142, the prediction module 144, the planning module 146, and/or the control module 148, to produce reference object(s), first plan(s), and/or first control(s). More specifically, the perception module 142 may process the first sensor data and the LD map data to generate the reference object(s), the prediction module 144 may determine first prediction(s) based on the reference object(s) and/or the LD map data, the planning module 146 may determine the first plan(s) based on the first predictions and/or the LD map data, and the control module 148 may determine the first control(s) based on the first plan(s) and/or the LD map data.

In general, the use of the LD map data is due to a lack of availability of map data of the second map type for the geographical location of the AV 110. Otherwise, if the AV 110 can access HD map data for the geographical location of the AV 110, the AV 110 may select the HD map data over the LD map data. However, in some examples, the AV 110 may have access to HD map data for the geographical location of the AV 110 but may choose not to utilize the HD map data when the HD map data has a lower quality than the LD map data. In some instances, the lower quality can be based on estimated variations on the map data, for example, the AV 110 may determine that certain information in the available HD map data may be invalid or different from LD map data and/or the first sensor data. In other instances, the lower quality may be based on the age of sensor data that was used to create each part of the available HD map data, for example, the AV 110 may track the time when the sensor data was collected and set an expiration timer for the sensor data as well as for the HD map data that uses the sensor data.

At 208, the AV 110 may determine generated HD map data (e.g., the generated second map data 124) using the LD map data and the reference object(s) determined from 206. The AV 110 may generate the HD map data in a variety of ways. In a first aspect, the HD map data may be generated by rendering the reference object(s) onto the LD map data as will be discussed more fully below with reference to FIG. 3. In a second aspect, the HD map data may be generated by an ML model that uses the composite map data and the first sensor data as will be discussed more fully below with reference to FIGS. 4-6. In a third aspect, multiple possibilities of HD map data may be generated and only one may be merged to the composite map data as will be discussed more fully below with reference to FIGS. 4-6. In a fourth aspect, multiple possibilities of HD map data may be generated, and all possibilities of HD map data may be processed independently to generate multiple predictions and corresponding probabilities, which are then collectively used in planning as will be discussed more fully below with reference to FIGS. 4-6. In a fifth aspect, the resolution of the generated HD map data is matched to the resolution of the HD map type, for example, using a ML based system as will be discussed more fully below with reference to FIGS. 4-6.

At 210, the AV 110 may feed the generated HD map data and the first sensor data to perception, perception, prediction, and planning to produce HD object(s), plan(s), and/or control(s) in the first environment. For instance, the AV 110 may input the generated HD map data and the first sensor data to AV processing stack 140, for example, for processing by the perception module 142, the prediction module 144, the planning module 146, and/or the control module 148, to produce HD object(s), second plan(s), and/or second control(s). More specifically, the perception module 142 may process the first sensor data and the generated HD map data to generate the HD object(s), the prediction module 144 may determine second prediction(s) based on the HD object(s) and/or the generated HD map data, the planning module 146 may determine the second plan(s) based on the second predictions and/or the generated HD map data, and the control module 148 may determine the second control(s) based on the second plan(s) and/or the generated HD map data.

At 220, the AV 110 may compare the first plan(s) and/or first control(s) determined based on the reference object(s) to the second plan(s) and/or second control(s) determined based on the HD object(s).

At 214, the AV 110 may determine final object(s), plan(s), and/or control(s) based on the comparison performed at 220. For instance, if the first plan(s) and/or first control(s) determined based on the reference object(s) and the composite map data provides the AV 110 with a higher performance metric or driving score, the AV 110 may select the first plan(s) and/or first control(s). If, however, the second plan(s) and/or second control(s) determined based on the HD object(s) and the generated HD map data provides the AV 110 with a higher performance metric or driving score, the AV 110 may select the second plan(s) and/or second control(s). In other instances, the AV 110 may combine or modify the first plan(s) with the second plan(s) and/or combine or modify the first control(s) with the second control(s) to determine the final plan(s) and/or final control(s) for driving the AV 110.

At 216, the AV 110 may drive or maneuver the AV 110 based on the final object(s), plan(s), and/or control(s) determined at 214. The driving or maneuvering may include at least one of an acceleration, a deceleration, a steering, a braking, etc.

Figure 3:
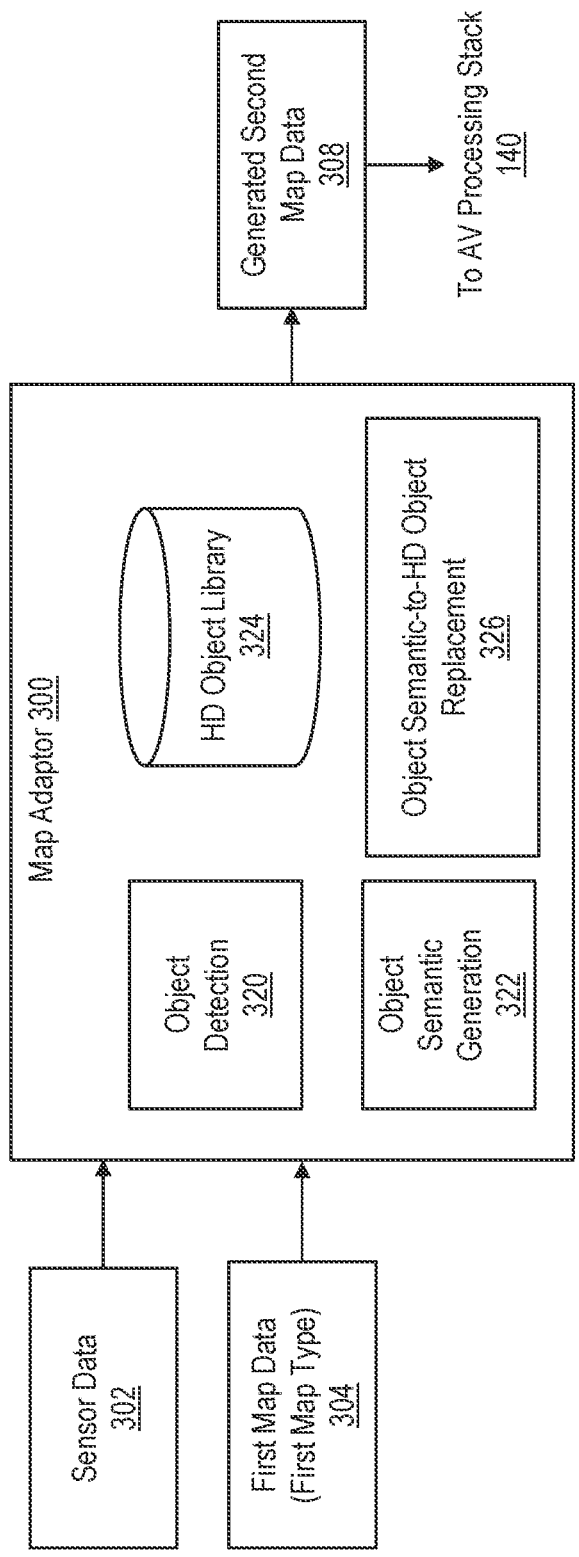
FIG. 3 provides an illustration of an exemplary implementation of a map adaptor, according to some embodiments of the present disclosure.

FIG. 3 provides an illustration of an exemplary implementation of a map adaptor 300, according to some embodiments of the present disclosure. In some aspects, the AV 110 of FIG. 1 may implement the map adaptor 300 in place of the map adaptor 130 shown in FIG. 1. For instance, the map adaptor 300 can be implemented in software executed by the one or more processors of the onboard computer 160.

At a high level, the map adaptor 300 may receive sensor data 302 and first map data 304 of the first map type (e.g., LD map type). The sensor data 302 may be received from cameras, LIDAR sensors in the sensor suite 150 of the AV 110 and may include camera images and/or point clouds representing road objects or road elements in the surroundings of the AV 110. The first map data 304 may be received from a local map database at the AV 110 or a remote map database and may include basic roadway information (e.g., the locations and geometry of the roads and lanes 104 in the roadway system 102) in a geographical area in which the AV 110 is located. In some instances, the first map data 304 can also include roadside object information, but the roadside information may not be as detailed or as accurate as would be for the second map type. Accordingly, the map adaptor 300 may detect, from the sensor data 302, one or more objects (e.g., the trees 114, the road sign 116, the traffic light 117, the buildings 118, the object 119, etc.) in the surrounding environment of the AV 110 that are absent from the first map data 304. The detected one or more objects may be related to attributes or features of the second map type (e.g., HD map features or attributes). The map adaptor 300 may combine the first map data 304 with information associated with the detected one or more objects to generate second map data 308. The generated second map data 308 may simulate the second map type so that the AV processing stack 140 dependent on the second map type may be reused to process the generated second map data 308.

As shown in FIG. 3, the map adaptor 300 may include an object detection sub-module 320, an object-semantic generation sub-module 322, an HD object library 324, and an object-semantic-to-HD object replacement sub-module 326. The object detection sub-module 320 may process the sensor data 302 (including the images and/or point clouds representing the surroundings of the AV 110). The object detection sub-module 320 may implement any suitable object detection algorithms to determine objects (e.g., traffic lights, road signs, road markings, buildings, trees, barriers, etc.) in the AV 110's vicinity. In some examples, the object detection sub-module 320 may implement one or more classifiers to differentiate cars from non-cars, pedestrians from non-pedestrians, or more generally identify particular object(s). In some examples, the object detection sub-module 320 can coordinate with the AV processing stack 140 to detect the objects, for example, by feeding the sensor data 302 and the first map data 304 to the AV processing stack 140 for processing by the perception module 142, the prediction module 144, the planning module, and/or the control module 148.

The object-semantic generation sub-module 322 may generate semantics or labels (e.g., meanings) for the detected objects. For instance, the object-semantic generation sub-module 322 may add semantics information of the detected objects to the first map data 304 to generate intermediate map data. The semantics information or labels may be added to the first map data 304 according to the actual locations of the detected objects in the area. In some examples, the object-semantic generation sub-module 322 may determine the locations of the detected objects with respect to a current location of the AV 110 and add object labels to the intermediate map data according to the determined locations. As an example, when a traffic light (e.g., the traffic light 117) is detected at an intersection between a road A and a road B, the object-semantic generation sub-module 322 may add a label "traffic light" at a corresponding location in the first map data 304 to generate the intermediate map data.

The HD object library 324 may include a collection of HD representations (e.g., images) of various objects. The HD object library 324 may store one image for each object or each type of objects, e.g., an image for a road sign, an image for a traffic light, an image for a building, an image for a tree, an image for a crosswalk, etc. In some examples, the HD object library 324 may store multiple images for one object or one object type, for example, including a 3D representation, a 2D representation, and/or representations of various orientations of the object or object type. The object-semantic-to-HD object replacement sub-module 326 may replace the semantics or labels (describing the detected objects) in the intermediate map data with corresponding HD representations of the detected objects to generate the second map data 308 simulating the second map type. For instance, the object-semantic-to-HD object replacement sub-module 326 may replace the label "traffic light" in the intermediate map data with a representation (e.g., an image) of a traffic light selected from the HD object library 324 to generate the second map data 308.

Stated differently, the generation of the second map data 308 may include the objection detection sub-module 320 detecting objects from the sensor data 302, the object-semantic generation sub-module 322 combining the first map data 304 with semantics indicative of the detected objects to provide the generated second map data 308, and the HD object library 324 replacing the semantics in the generated second map data 308 with a representation of the detected objects at respective locations based on the detection. That is, the detected objects can be rendered onto the first map data 304 to provide the generated second map data 308. Subsequently, the generated second map data 308 may be provided to the AV processing stack 140. One or more modules (e.g., the perception module 142, the prediction module 144, the planning module 146, the control module 148, and/or other modules) of the AV processing stack 140 may determine an action (e.g., a driving decision) for the AV 110 using the generated second map data 308 and the sensor data 302.

While the map adaptor 300 is explained in the context of generating the second map data 308 from the first map data 304 of the first map type and the sensor data 302, aspects are not limited thereto. For instance, the map adaptor 300 can generate composite data from the first map data 304 of the first map type with previously generated HD map data and then generate the second map data 308 using the composite map data the sensor data 302 as discussed above with reference to 204, 206, and 208 of FIG. 2.

Figure 4:
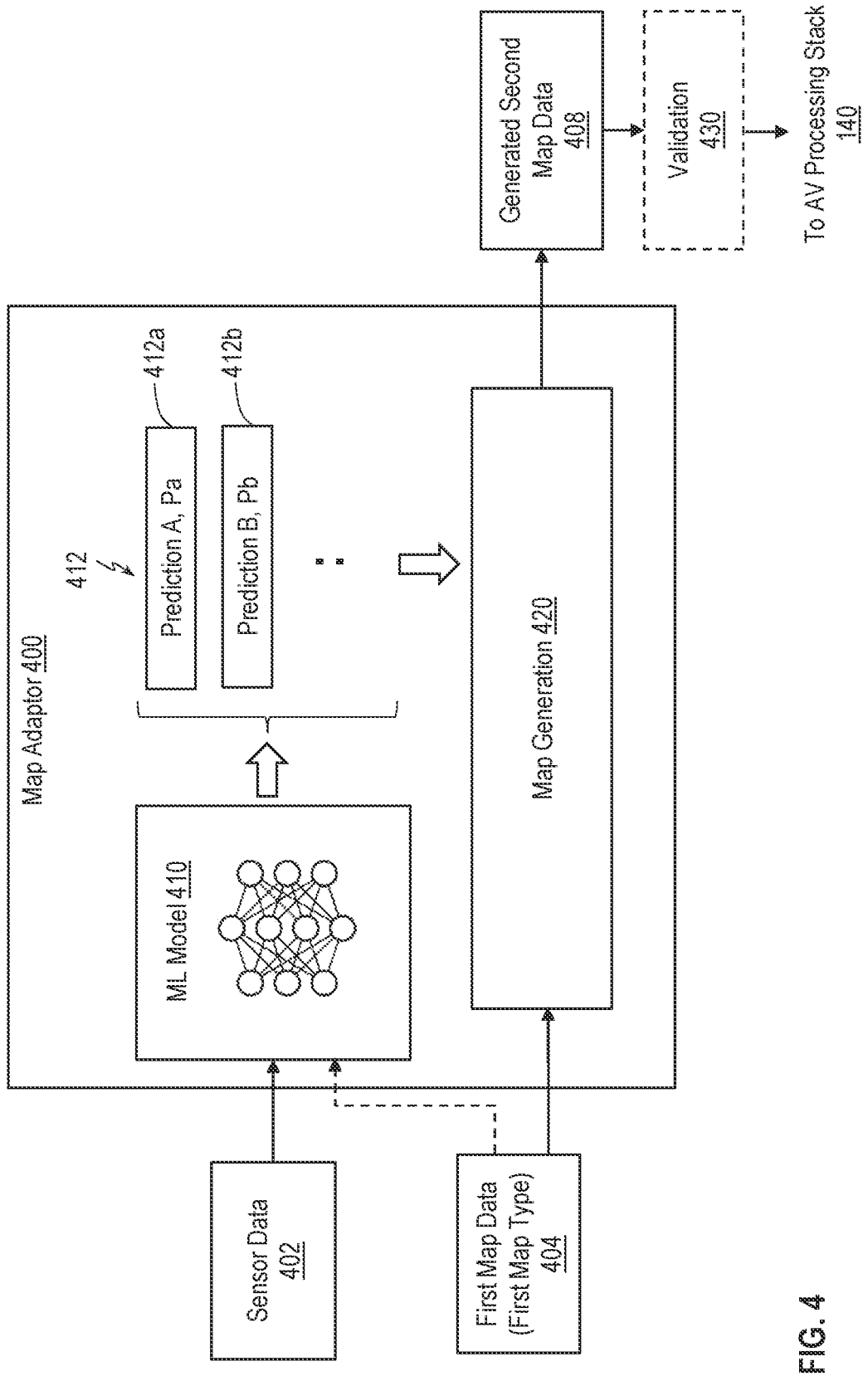
FIG. 4 provides an illustration of an exemplary implementation of a map adaptor, according to some embodiments of the present disclosure.

FIG. 4 provides an illustration of an exemplary implementation of a map adaptor 400, according to some embodiments of the present disclosure. In some aspects, the AV 110 of FIG. 1 may implement the map adaptor 400 in place of the map adaptor 130 shown in FIG. 1. For instance, the map adaptor 400 can be implemented in software executed by the one or more processors of the onboard computer 160.

At a high level, the map adaptor 400 may receive sensor data 402 (e.g., from cameras, LIDAR sensors of the sensor suite 150) and first map data 404 of the first map type (e.g., from a local map database or a remote map database). The sensor data 402 and the first map data 404 may be substantially similar to the sensor data 302 and the first map data 304, respectively. However, the sensor data 402 may include an obstructed view (e.g., blocked by a truck or a parked car) of a certain area around the AV 110, and thus one or more objects (e.g., traffic lights, road signs, road markings, buildings, trees, barriers, etc.) may be unidentifiable or not available from the sensor data 402. Accordingly, the map adaptor 400 may utilize a prediction model to predict object(s) in that area.

As shown in FIG. 4, the map adaptor 400 may include an ML model 410 and a map generation sub-module 420. The ML model 410 may be a neural network including a plurality of layers, each including weights and/or biases as discussed above. The ML model 410's parameters (e.g., weights and/or biases) may be trained and adapted to predict missing objects (or an obstructed view) in a certain scene represented by the sensor data 402. For instance, the ML model 410 may predict objects in a certain area (with an obstructed view) in the AV 110's vicinity based on the sensor data 402.

The ML model 410 may process the sensor data 402 (e.g., by passing the sensor data 402 through each of the plurality of layers for computations using respective parameters for the layer) to generate a set of outputs 412 (shown as 412a, 412b, . . . ). The outputs 412 may include one or more predictions and a confidence level (e.g., a probability) for each prediction. For instance, the output 412a may indicate a predicted object A with a prediction confidence level or probability of Pa, and the output 412b may indicate a predicted object B with a prediction confidence level or probability of Pb. The predicted object A and/or the predicted object B may be features associated with the second map type. As an example, the output 412a may indicate that a road sign is predicted at a first location within the obstructed area with a probability of 60% and the output 412b may indicate a traffic light is predicted at a second location within the obstructed area with a probability of 40%, where the second location may be the same as the first location or different from the first location. In general, the predicted objects can include any road elements such as traffic lights, road signs, road markings, buildings, trees, barriers, etc. In some examples, the first map data 404 may also be processed by the ML model 410 to generate the predictions or outputs 412.

The prediction results or outputs 412 may be provided to the map generation sub-module 420. The map generation sub-module 420 may generate second map data 408 of the second map type to include a representation of the one or more predicted objects at respective locations in the surrounding environment of the AV 110, and respective prediction confidence levels for the one or more predicted objects. For instance, the map generation sub-module 420 may determine a current location of the AV 110 within an area represented by the first map data 404, determine locations of the predicted objects with respect to the current location of the AV 110, and combine the predicted objects and associated prediction confidence levels with the received first map data 404 according to the locations of the predicted objects to generate second map data 408 simulating the second map type. Referring to the example above where the ML model 410 predicted a road sign at a first location with a probability of 60% and a traffic light at a second location with a probability of 40%, the map generation sub-module 420 may add a representation (e.g., an image or a symbol) of a road sign along with an indication of a probability of 60% at the first location and a representation of a traffic light along with an indication of a probability of 40% at the second location to the first map data 404 to generate the second map data 408. Subsequently, the generated second map data 408 may be provided to the AV processing stack 140. One or more modules (e.g., the perception module 142, the prediction module 144, the planning module 146, the control module 148, and/or other modules) of the AV processing stack 140 may determine an action (e.g., a driving decision) for the AV 110 using the generated second map data 408 and the sensor data 402.

As further shown in FIG. 4, the AV 110 (or the onboard computer 160) may optionally include a validation module 430 to validate the generated second map data 408 generated by the map adaptor 400. The validation module 430 may validate the predicted objects indicated in the generated second map data 408. For instance, the validation module 430 may determine whether a predicted object indicated by the generated second map data 408 should be kept for subsequent AV processing or should be discarded. The validation or determination may be based on one or more criteria. As an example, the one or more criteria may include a prediction confidence level threshold for determining whether a predicted object may be kept or discard. In some instances, the prediction confidence level threshold may vary, for example, depending on the object type, other objects in the scene, and/or certain rules. As another example, the one or more criteria may include a set of driving rules so that the addition of the predicted object may not violate a certain driving measure or driving standard. As a further example, the one or more criteria may include a set of heuristic rules, for example, not to introduce a critical object such as a traffic light or a barrier into the area with the obstructed view. In some aspects, the validation module 430 can be implemented using ML, for example, a classifier.

While FIG. 4 illustrates the validation module 430 as a separate module outside of the map adaptor 400 and the AV processing stack 140, aspects are not limited thereto. For example, the validation module 430 can be implemented as part of the map adaptor 400. Alternatively, the validation module 430 can be implemented as part of the AV processing stack 140. Yet alternatively, a portion of the validation module 430 can be implemented as part of the map adaptor 400 and another portion of the validation module 430 can be implemented as part of the AV processing stack 140. In general, the map adaptor 400 can generate multiple possibilities of map data (e.g., generated HD map data) from the sensor data 402 and the first map data 404 of the first map type. For example, the map adaptor 400 may filter and select one map data from the multiple possibilities of map data and output the selected map data as the generated second map data 408 for processing by the AV processing stack 140. Alternatively, the map adaptor 400 may provide all possibilities of the generated map data (e.g., without filtering) as the generated second map data 408, and the AV processing stack 140 may process each possibility of the generated map data separately and independently to generate multiple predictions and corresponding probabilities, which are then collectively used in planning.

Additionally, while the map adaptor 400 is explained in the context of generating the second map data 408 from the first map data 404 of the first map type and the sensor data 402, the map adaptor 400 (or the map generation sub-module 420) can generate composite data from the first map data 404 of the first map type with previously generated HD map data and then generate the second map data 408 using the composite map data the sensor data 402 as discussed above with reference to 204, 206, and 208 of FIG. 2.

Further, while FIG. 4 illustrates the map adaptor 400 adapts the first map data 404 of the first map type to the second map data 408, in other instances, the map adaptor 400 may also be used to fill missing portion in input map data of the second map type. In such instances, the map generation sub-module 420 may combine the input map data of the second map type with the prediction outputs 412.

Figure 5:
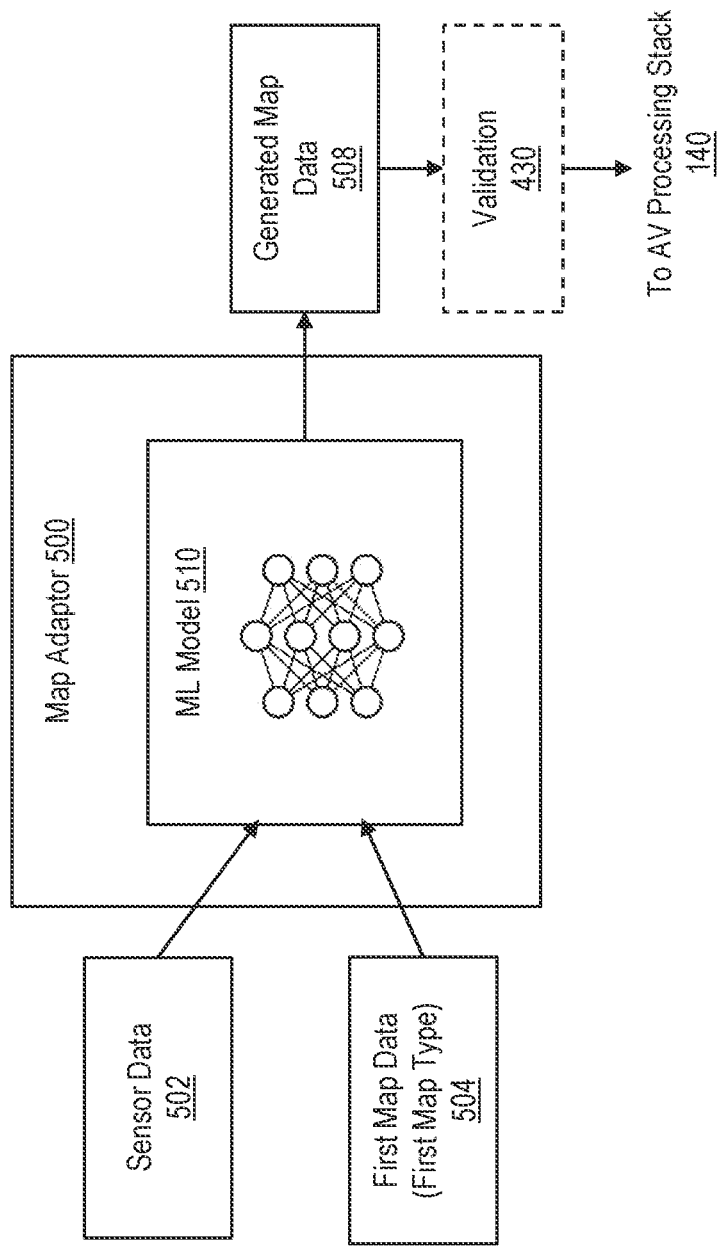
FIG. 5 provides an illustration of an exemplary implementation of a map adaptor, according to some embodiments of the present disclosure.

FIG. 5 provides an illustration of an exemplary implementation of a map adaptor 500, according to some embodiments of the present disclosure. In some aspects, the AV 110 of FIG. 1 may implement the map adaptor 500 in place of the map adaptor 130 shown in FIG. 1. For instance, the map adaptor 500 can be implemented in software executed by the one or more processors of the onboard computer 160.

As shown in FIG. 5, the map adaptor 500 may include an ML model 510. The map adaptor 500 may receive sensor data 502 (e.g., from cameras, LIDAR sensors of the sensor suite 150) and first map data 504 of the first map type (e.g., from a local map database or a remote map database). The sensor data 502 may be substantially similar to the sensor data 302 and/or 402. The first map data 504 may be substantially similar to the first map data 304 and/or 404.

The ML model 510 may be a neural network including a plurality of layers, each including weights and/or biases as discussed above. In some aspects, the ML model 510 may be a generator model trained using an open loop training as will be discussed more fully below with reference to FIG. 7. In other aspects, the ML model 510 may be a generator model that is trained jointly with a discriminator model in a GAN model as will be discussed more fully below with reference to FIGS. 8-10. The ML model 510 may process the sensor data 502 and the first map data 504 of the first map type (e.g., through each of the plurality of layers for computations using respective parameters for the layer) to generate second map data 508 of the second map type.

In one aspect, the ML model 510's parameters (e.g., weights and/or biases) may be trained and adapted to detect or identify, from the sensor data 502, objects associated with the second map type and combine the identified objects with first map data 504 to output second map data 508 of the second map type. Some examples of the detected objects may include but not limited to traffic lights, road signs, road markings, buildings, trees, and/or barriers. In another aspect, the sensor data 502 may include an obstructed view of an area around the AV 110 similar to the sensor data 402 discussed above. Accordingly, the ML model 510's parameters (e.g., weights and/or biases) may be trained and adapted to predict, from the sensor data 502, objects associated with the second map type (that may be present at certain location(s) in the scene) and combine the predicted objects with the first map data 504 to output second map data 508 of the second map type. Some examples of the predicted objects may include but not limited to traffic lights, road signs, road markings, roads, lanes, buildings, trees, and/or barriers. In yet another aspect, the ML model 510's parameters (e.g., weights and/or biases) may be trained and adapted to detect, identify, and/or predict, from the sensor data 502, objects associated with the second map type and combine the identified and/or predicted objects with first map data 504 to output second map data 508 of the second map type. Additionally or alternatively, the ML model 510's parameters (e.g., weights and/or biases) may be trained and adapted to adjust the resolution and/or accuracy of the first map data 504 of the first map type to the resolution and/or accuracy of the second map type. Subsequently, the second map data 508 may be provided to the AV processing stack 140. One or more modules (e.g., the perception module 142, the prediction module 144, the planning module 146, the control module 148, and/or other modules) of the AV processing stack 140 may determine an action (e.g., a driving decision) for the AV 110 using the generated second map data 508 and sensor data 502.

In some aspects, the map adaptor 500 may generate composite map data from the first map data 504 of the first map type with previously generated HD map data and then generate the second map data 508 using the ML model 510 to process the composite map data the sensor data 502 as discussed above with reference to 204, 206, and 208 of FIG. 2.

As further shown in FIG. 5, the AV 110 (or the onboard computer 160) may optionally include a validation module 430 to validate the second map data 508 generated by the map adaptor 500 as discussed above with reference to FIG.

4. The validation module 430 can be implemented as part of the map adaptor 500 and/or as part of the AV processing stack 140 as discussed above with reference to FIG. 4. For instance, the map adaptor 500 can include multiple ML models 510 with different trained parameters and/or different ML architectures to generate multiple possibilities of map data (simulating the second map type) and may optionally filter the multiple possibilities of map data before processing by the AV processing stack 140 as discussed above with reference to FIGS. 2 and 4.

Figure 6:
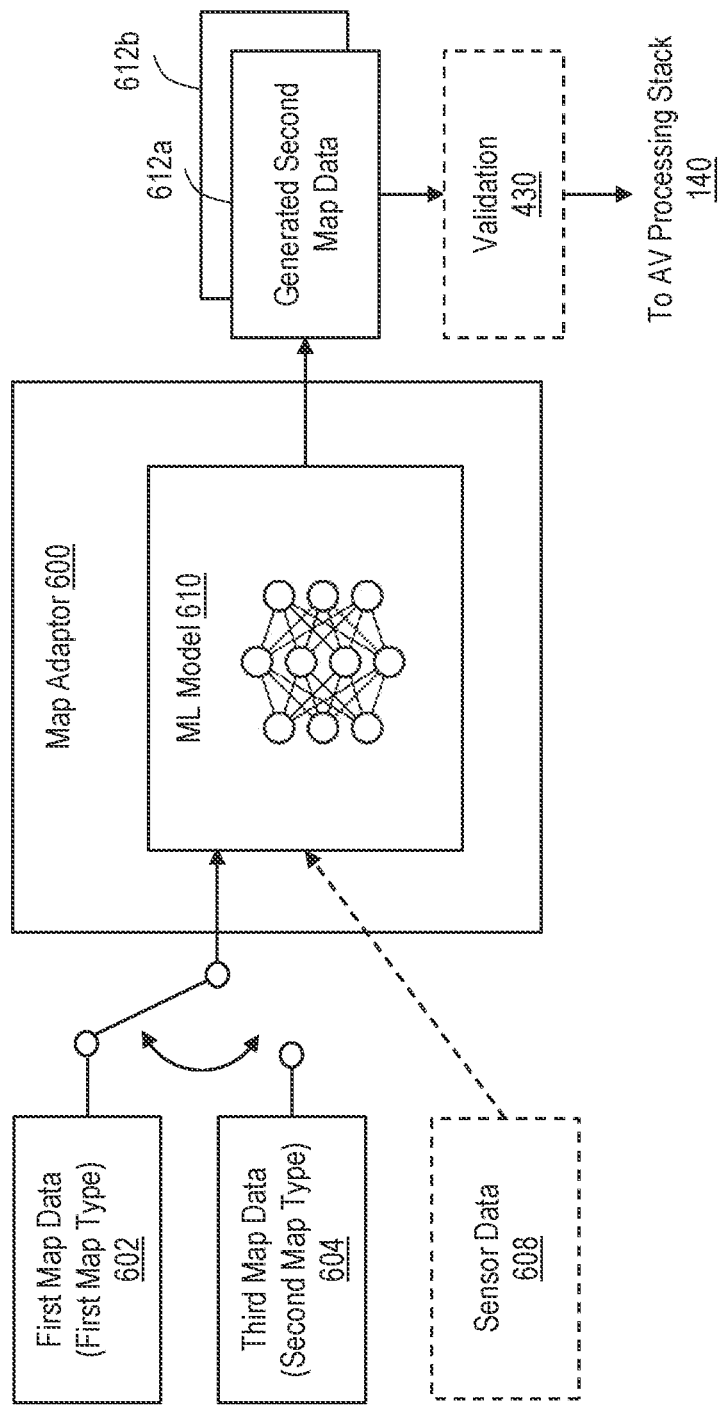
FIG. 6 provides an illustration of an exemplary implementation of a map adaptor, according to some embodiments of the present disclosure.

FIG. 6 provides an illustration of an exemplary implementation of a map adaptor 600, according to some embodiments of the present disclosure. In some aspects, the AV 110 of FIG. 1 may implement the map adaptor 600 in place of the map adaptor 130 shown in FIG. 1. For instance, the map adaptor 600 can be implemented in software executed by the one or more processors of the onboard computer 160.

The map adaptor 600 may be substantially similar to the map adaptor 500. For example, the map adaptor 600 may include an ML model 610 including a plurality of layers, each including weights and/or biases substantially similar to the ML model 510. However, the map adaptor 600 may operate on first map data 602 of the first map type at one time and third map data 604 of the second map type at another time. That is, the ML model 610 may be trained to process the first map data 602 of the first map type or the third map data 604 of the second map type, for example, to fill in hole(s) or missing map portions in respective map data 602 or 604, respectively. Alternatively, the ML model 610 may be trained to improve an accuracy or resolution of the first map data 602 of the first map type and/or the third map data 604 of the second map type.

In an aspect, the ML model 610's parameters (e.g., weights and/or biases) may be trained and adapted to generate (or synthesize) features missing in input map data or adapt the input map data to a certain representation. The missing features can be objects (e.g., traffic lights, road signs, lane markings, road arrows, road edges, drivable lanes, non-drivable lanes or areas, crosswalks, etc.) associated with the second map type. Additionally or alternatively, the missing features can be a portion of an area (e.g., unknown to the map data or an obstructed area) near a location of the AV 110. The adaptation can adapt from a lower map resolution to a higher map resolution or from a lower map precision to a higher map precision, from a 2D representation to a 3D representation, etc. In some aspects, the ML model 610 may be a generator model trained using an open loop training as will be discussed more fully below with reference to FIG. 7. In other aspects, the ML model 610 may be a generator model that is trained jointly with a discriminator model in a GAN model as will be discussed more fully below with reference to FIGS. 8-10.

For instance, the AV 110 (or the map adaptor 600) may receive map data of the first map type and/or map data of the second map type. For instance, during a first time period, the map adaptor 600 may receive first map data 602 of the first map type (e.g., from a local map database or a remote map database). The first map data 602 may be substantially similar to the first map data 304, 304, and/or 504. In a first example, the first map data 602 may have a missing map portion (e.g., a hole or empty area). The ML model 610 may process the first map data 602 of the first map type (e.g., through each of the plurality of layers for computations using respective parameters for the layer) to generate second map data 612a of the second map type. The generated second map data 610a may include various information or features (e.g., with roads, lanes, road markings, etc.) in the missing map portion. That is, the ML model 610 may generate (or synthesize) map information or features for a missing map portion. In a second example, the map adaptor 600 may further receive sensor data 608 (e.g., from cameras, LIDAR sensors of the sensor suite 150). The sensor data 608 may be substantially similar to the sensor data 302, 302, and/or 502. The ML model 610 may further process the sensor data 608 and generate the missing features (e.g., associated with the second map type) in the first map data 602 further based on the sensor data 608. The generated second map data 612a may include at one feature that is missing in the first map data 602. That is, the ML model 610 may adapt the first map data 602 of the first map type to the second map data 612a (simulating the second map type). In a third example, the map adaptor 600 may further receive the sensor data 608 with an obstructed view for a certain area around the AV 110, for example, similar to the sensor data 402 as discussed above with FIG. 4. The ML model 610 may further process the sensor data 608 and generate features in the obstructed area further based on the sensor data 608 to provide the second map data 612a. That is, the ML model 610 may generate (or synthesize) a view of an obstructed area. Subsequently, the second map data 612a may be provided to the AV processing stack 140. One or more modules (e.g., the perception module 142, the prediction module 144, the planning module 146, the control module 148, and/or other modules) of the AV processing stack 140 may determine an action (e.g., a driving decision) for the AV 110 using the second map data 612a and the sensor data 608.

During a second period different from the first period, the map adaptor 600 may receive third map data 604 of the second map type (e.g., from a local map database or a remote map database). The third map data 604 may include a representation of roads (e.g., the roadway system 102 with roads and lanes 104) and various roadway artifacts (e.g., the road markings 106, trees 114, road sign 116, traffic light 117, buildings 118, etc.). The map adaptor 600 can optionally receive the sensor data 608. In one example, the ML model 610 may process the third map data 604 of the second map type (e.g., through each of the plurality of layers for computations using respective parameters for the layer) to generate second map data 612b of the second map type, for example, to fill in a missing map portion. In another example, the ML model 610 may process the third map data 604 of the second map type and the sensor data 608 to generate second map data 610b of the second map type, for example, to provide additional information about the surroundings of the AV 110 or generate (or synthesize) a view of an obstructed area around the AV 110. Subsequently, the second map data 612b may be provided to the AV processing stack 140. One or more modules (e.g., the perception module 142, the prediction module 144, the planning module 146, the control module 148, and/or other modules) of the AV processing stack 140 may determine an action (e.g., a driving decision) for the AV 110 using the second map data 612b and the sensor data 608.

While FIG. 6 illustrates the map adaptor 600 including one ML model 610, the map adaptor 600 can include multiple ML models with different trained parameters and/or different ML architectures. For example, a first ML model may be trained for predicting or synthesizing cars, a second ML model may be trained for predicting or synthesizing traffic lights, a third ML model may be trained for predicting or synthesizing an obstructed view, a fourth ML model may be trained for detecting certain object in a scene, etc.

As further shown in FIG. 6, the AV 110 (or the onboard computer 160) may optionally include a validation module 430 to validate the generated second map data 612 (e.g., 612a and 612b) generated by the map adaptor 600 as discussed above with reference to FIG. 3. Further, the validation module 430 can be implemented as part of the map adaptor 600 and/or as part of the AV processing stack 140. For instance, the map adaptor 600 can include multiple ML models 510 with different trained parameters and/or different ML architectures to generate multiple possibilities of map data (simulating the second map type) and may optionally filter the multiple possibilities of map data before processing by the AV processing stack 140 as discussed above with reference to FIGS. 2 and 4.

In some aspects, the AV 110 may utilize any suitable combination of map adaptation mechanisms discussed above with reference to FIGS. 2-6. In some aspects, the AV 110 can include multiple map adaptors, each implementing a different one of the map adaptors 300, 400, 500, or 600, and may utilize a different one of the map adaptors at a different time (e.g., based on certain geographical areas and/or any suitable factors). Additionally, the AV 110 may further receive location information from a GPS and/or an IMU in the sensor suite 150 of the AV 110, where the AV location information may be associated with a current location of the AV 110 and may include data describing a geographical location (e.g., GPS coordinates) of the AV 110 and/or an orientation of the AV 110 with respect to its surroundings. The AV 110 may utilize the AV location information for map adaptation and/or for determining an action (e.g., steering, braking, accelerating, decelerating, etc.) to be carried out for the AV 110.

Example ML Model Training for Map Adaptation

FIGS. 7-10 illustrate various mechanisms for training the ML models 410, 510, and/or 610 for performing map adaptation as discussed above with reference to FIGS. 4, 5, and/or 6, respectively.

Figure 7:
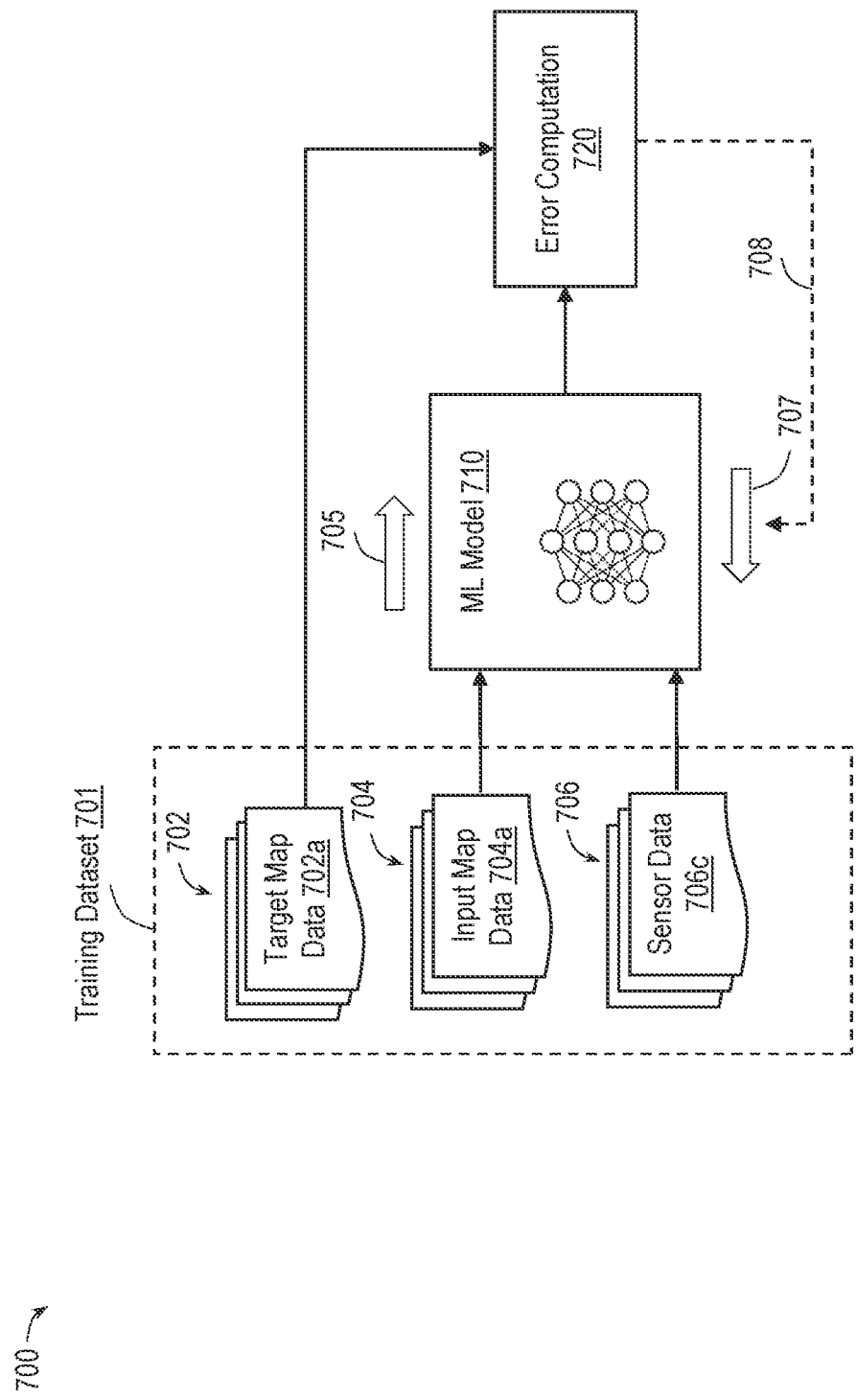
FIG. 7 provides an illustration of an exemplary scheme for training a machine learning (ML) model for map adaptation, according to some embodiments of the present disclosure.

FIG. 7 provides an illustration of an exemplary scheme 700 for training an ML model 710 for map adaptation, according to some embodiments of the present disclosure. For instance, the ML model 710 may be a generative model and may correspond to the ML model 510 of FIG. 5 or the ML model 610 of FIG. 6, and a trained ML model 710 can be deployed in the AV 110 for map adaptation as discussed above with reference to FIGS. 1-2, 5, and/or 6. The scheme 700 may be implemented by a computer-implemented system (e.g., the system 1500 of FIG. 15).

As shown in FIG. 7, the ML model 710 may operate on a training dataset 701. The training dataset 701 may include target map data 702, input map data 704, and sensor data 706. Each sample of input map data 704 may be associated with a sample of sensor data 706 and a sample of target map data 702. For instance, the training data set 701 may include first input map data 704a and associated first target map data 702a and first sensor data 706a. The first input map data 704a and the first target map data 702a may include map information (e.g., geographical information of roadways, roadside object information, etc.) for the same geographical area. However, the first target map data 702a may include at least one feature (e.g., parking spots, lane boundaries, intersections, crosswalks, stop signs, traffic lights, etc.) that is absent from first input map data 704a. The first sensor data 706a may include a capture or a representation (e.g., an image or point cloud) of the at least one feature.

The ML model 710 may include an input layer, followed by one or more hidden layers and an output layer, and each layer may include a set of weights and/or biases that can transform inputs received from a previous layer and the resulting outputs can be passed to the next layer as discussed above. The weights and/or biases in each layer of the ML model 710 can be trained and adapted to generate or synthesize missing feature(s) or missing map portion(s) in the first input map data 704a.

To train the ML model 710, the first input map data 704a and the first sensor data 706a may be input to the ML model 710 and propagated through each layer of the ML model 710 in a forward direction (e.g., a forward propagation process 705). More specifically, the ML model 710 may process the first input map data 704a and the first sensor data 706a at each layer of the ML model 710 according to respective parameters such as weights and/or biases for the layer. The error computation module 720 may compute an error based on the ML model 710's output and the target map data 702a and determine a loss based on the error. The loss may be used to update the ML model 710 as shown by the dashed arrow 708, for example, by performing a backpropagation process 707 through the layers of the ML model 710 while adjusting the weights and/or biases at each layer of the ML model 710. The forward propagation process 705 and the backpropagation process 707 can be repeated until the error is minimized or the loss metric satisfies certain criteria.

In another aspect, the ML model 710 may correspond to the ML model 410 of FIG. 4, and a trained ML model 710 can be deployed in the AV 110 for map adaptation as discussed above with reference to FIG. 4. The ML model 710 may be trained to perform inference as discussed in FIG. 4 using substantially the same mechanisms as for the ML model 510 of FIG. 5 and/or the ML model 610 of FIG. 5 discussed above. However, the training data set 701 may include multiple pairs of input sensor data with certain missing features (e.g., parking spots, lane boundaries, intersections, crosswalks, stop signs, traffic lights, etc.) and corresponding target object labels. The weights and/or biases in each layer of the ML model 710 can be trained and adapted to predict missing features or objects in the first input map data 704a. For training, the ML model 710 may process the input sensor data, the error computation module 720 may compute an error and/or a loss measures based on the ML model 710's output (e.g., predicted objects and corresponding prediction confidence levels) and the target object labels, and the backpropagation process 707 may be performed to update the ML model 710's parameters (e.g., weights and/or biases at each layer of the ML model 710). The trained ML model 710 can be deployed in the AV 110 for map adaptation as discussed above with reference to FIGS. 1 and 3.

Figure 8:
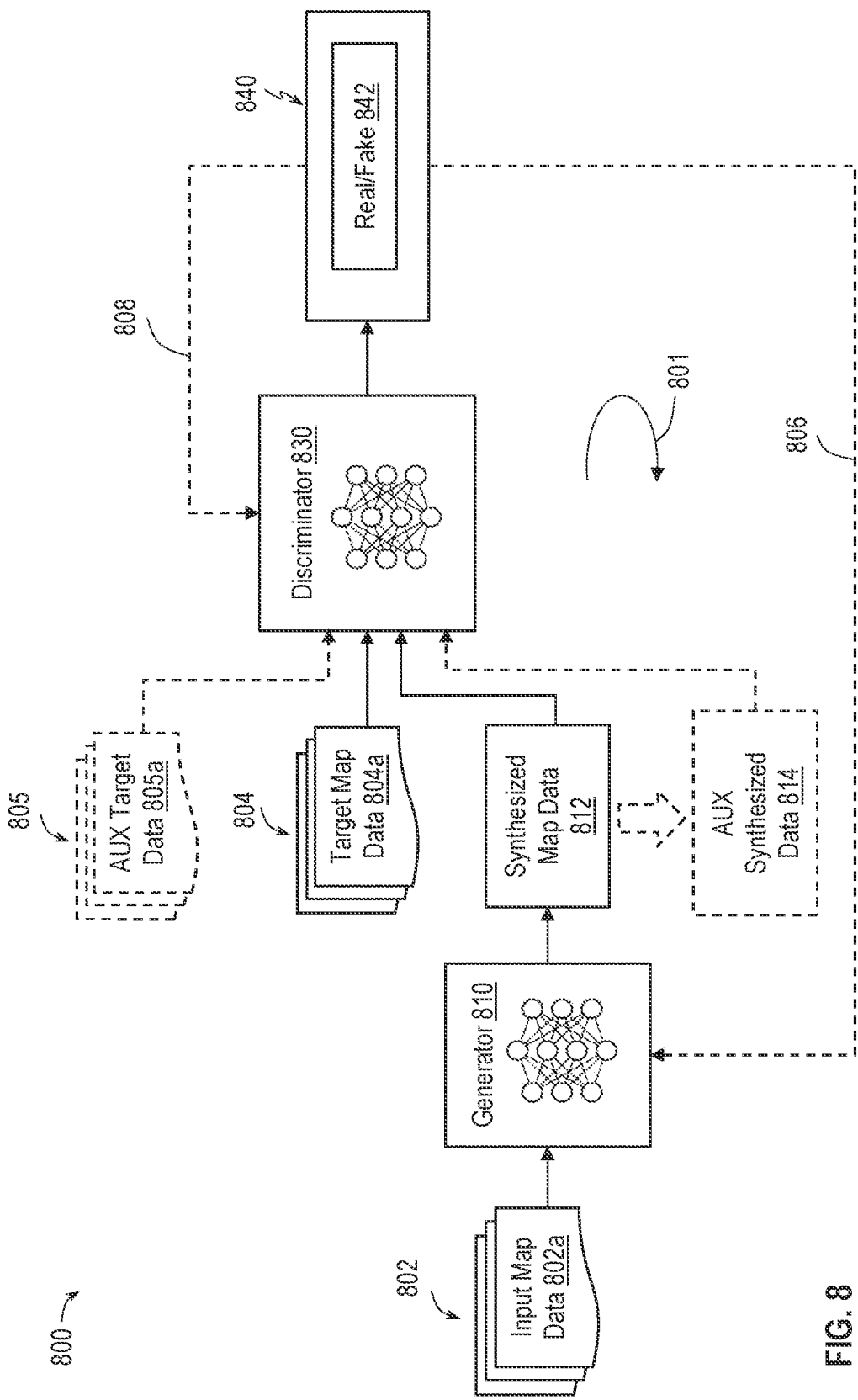
FIG. 8 provides an illustration of an exemplary generative adversarial network (GAN) model for training a generator model for map adaptation, according to some embodiments of the present disclosure.

FIG. 8 provides an illustration of an exemplary GAN model 800 for training a generator model 810 for map adaptation, according to some embodiments of the present disclosure. For instance, the generator model 810 may correspond to the ML model 510 of FIG. 5 or the ML model 610 of FIG. 6, and the trained generator model 810 can be deployed in the AV 110 for map adaptation as discussed above with reference to FIGS. 1-2, 5, and/or 6. The GAN model 800 may be implemented by a computer-implemented system (e.g., the system 1500 of FIG. 15).

As shown in FIG. 8, the GAN model 800 may include the generator model 810 and a discriminator model 830 operating in a closed loop 801. Each of the generator model 810 and the discriminator model 830 may be an ML model including an input layer, followed by one or more hidden layers and an output layer. Each layer may include a set of weights and/or biases that can transform inputs received from a previous layer and the resulting outputs can be passed to the next layer. For map adaptation, the weights and/or biases in each layer can be trained and adapted, for example, to generate or synthesize map data from input map data with missing features or missing map features, in the case of the generator model 810, or to classify if a synthesized map is real or fake, in the case of the discriminator model 830.

The GAN model 800 may be trained using a training data set including input map data 802 and target map data 804. Each sample of input map data 802 may be associated with a sample of target map data 804. For instance, the training data set may include first input map data 802a and associated first target map data 804a. The first input map data 802a and the first target map data 804a may include map information (e.g., geographical information of roadways, roadside object information, etc.) for the same geographical area. But, the first target map data 804a may include at least one feature (e.g., parking spots, lane boundaries, intersections, crosswalks, stop signs, traffic lights, etc.) that is absent from input map data 802a. In some instances, the first input map data 802a may have a hole or a missing map portion (e.g., with no data describing a portion of the geographical area), for example, generated by taking the first target map data 804a and removing a portion of the first target map data 804a.

To train the generator model 810, the first input map data 802a may be passed through each layer the generator model 810 in a forward direction. The generator model 810 may process the first input map data 802a at each layer of the generator model 810 according to respective parameters such as weights and/or biases for the layer. The generator model 810 may output synthesized map data 812. The synthesized map data 812 and the first target map data 804a may be input into the discriminator model 830. The discriminator model 830 may process the synthesized map data 812 and the first target map data 804a (e.g., the real map data) at each layer of the discriminator model 830 according to respective parameters such as weights and/or biases for the layer. The discriminator model 830 may output a predicted probability of whether the synthesized map data 812 input to the discriminator model 830 is a real sample or a fake sample (e.g., a generated map data sample). A loss function 840 such as a binary cross entropy loss function may be used to compute a real/fake score 842 that penalizes the discriminator model 830's output probability based on a distance from a corresponding expected or target value. The real/fake score 842 output by the loss function 840 is then used to update the discriminator model 830 as shown by the arrow 808 and the generator model 810 as shown by the arrow 806. Each of the generator model 810 and discriminator model 830 may be updated using a backpropagation process to adjust the weights and/or biases at respective model layers discussed above with reference to FIG. 7.

After the updates, the loop 801 may be repeated. In general, the discriminator model 830 may be updated to be better at discriminating between a real sample and a fake sample in a next iteration of the loop 801, while the generator model 810 may be updated based on how well, or not the synthesized map data 812 fooled the discriminator model 830 in classifying the synthesized map data 812 as a real sample. The loop 801 can be repeated until the discriminator model 830 until map data generated by the generator model 810 is indistinguishable from the first target map data 804a. That is, the discriminator model 830 may classify the map data generated by the generator model 810 as real. After that, the training of the generator model 810 and the discriminator model 830 can be repeated for a next input map data 802 and associated target map data 804.

In some aspects, after the generator model 810 and the discriminator model 830 are trained, map data generated by the generator model 810 that are classified as real samples by the discriminator model 830 may be fed back into the training set as target map data 804 for subsequent training. In other words, the GAN model 800 can also be used to generate training data samples for training a ML model (e.g., the ML models 410, 510, 610, 710, and/or 810) for map adaptation. That is, in some aspects, the input map data 802 can include map data generated by the model 800.

In some aspects, it may be desirable to train the GAN model 800 such that map data generated by the generator model 710 may be statistically similar to corresponding target map data 804. Stated differently, the generator model 810 may be trained to generate a missing map portion for the first input map data 802a that is statistically indistinguishable from the corresponding first target map data 804a, and the discriminator model 830 is trained to distinguish the output of the generator model 810 from the first target map data 702a based on map statistical features. For instance, the training data set can optionally include auxiliary (AUX) data 805 associated with the target map data 804. The auxiliary data 805 may include first auxiliary data 805a associated with the first target map data 804a. The first auxiliary data 805a may include statistical measurement information associated with frequency components or spectra of the first target map data 804a, an average color of the first target map data 804a, an average brightness of the first target map data 804a, density of information in the first target map data 804a, an entropy of the first target map data 804a, histograms of colors in the first target map data 804a, histograms of adjacent colors in the first target map data 804a, etc.

To train the discriminator model 830 to discriminate real/fake based on map statistics, the training may include generating auxiliary data 814 from the synthesized map data 812, for example, by computing at least one of frequency components or spectra of synthesized map data 812, an average color of the synthesized map data 812, an average brightness of the synthesized map data 812, density of information of the synthesized map data 812, an entropy of the synthesized map data 812, histograms of colors in the synthesized map data 812, histograms of adjacent colors in the synthesized map data 812, etc. The discriminator model 830 can process the first target map data 804a and associated first auxiliary data 805a, the synthesized map data 812 and associated auxiliary data 814. In this way, the discriminator model 830's output probability may incorporate map statistic information, and the real/fake score 842 generated by the loss function 840 may score the synthesized map data 812 based on how well, or not well the synthesized map data 812 in reproducing map statical measures compared to the first target map data 804a.

Figure 9:
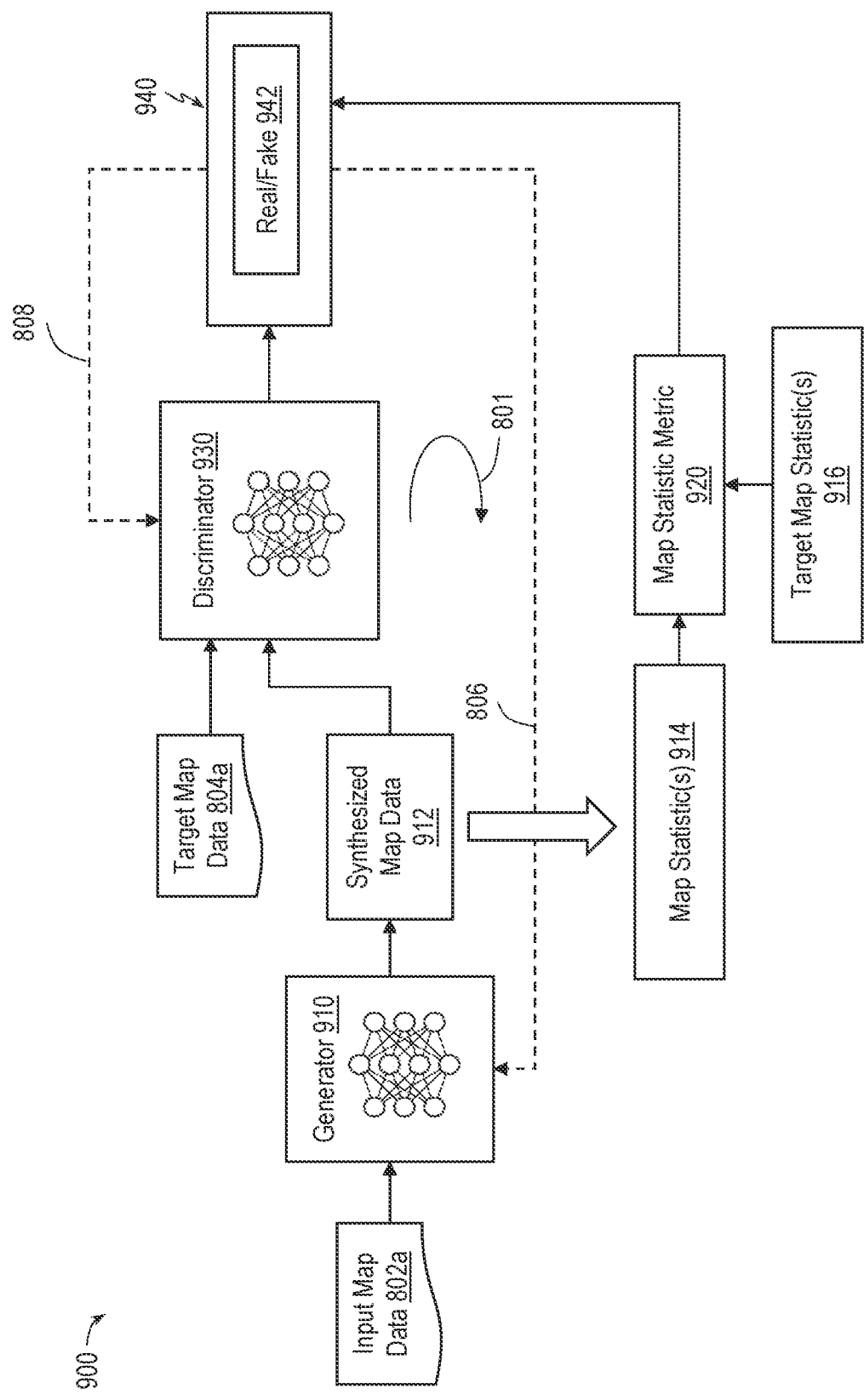
FIG. 9 provides an illustration of an exemplary GAN model for training a generator model for map adaptation, according to some embodiments of the present disclosure.

FIG. 9 provides an illustration of an exemplary GAN model 900 for training a generator model 910 for map adaptation, according to some embodiments of the present disclosure. For instance, the generator model 910 may correspond to the ML model 510 of FIG. or the ML model 610 of FIG. 6, and the trained generator model 910 can be deployed in the AV 110 for map adaptation as discussed above with reference to FIGS. 1-2, 5, and/or 6. The GAN model 900 may be implemented by a computer-implemented system (e.g., the system 1500 of FIG. 15).

The GAN model 900 may be similar to the GAN model 800 in many respects. For example, the GAN model 900 may include a generator model 910 and a discriminator model 930 having substantially the same architecture as the generator model 810 and the discriminator model 830, respectively, and may be trained in a closed loop 801 (to update the generator model 910 and the discriminator model 930) as discussed with reference to FIG. 8. Further, the GAN model 900 may be trained using first input map data 802a and corresponding target map data 804a. However, the discriminator model 930 may be trained to discriminate between real/fake based on map statistical information by modifying a loss function 940 instead of passing auxiliary data including map statistical information of the target map data 804 and map statistical information computed from the synthesized map data 812 through the discriminator model 830 as in FIG. 8.

As shown in FIG. 9, the generator model 910 may process the first input map data 802a to output synthesized map data 912. To train the discriminator model 930 to discriminate real/fake based on map statistics, map statistic(s) 914 can be calculated for the synthesized map data 912. For example, calculating the map statistic(s) 914 can include calculating at least one of frequency components or spectra of synthesized map data 912, an average color of the synthesized map data 912, an average brightness of the synthesized map data 912, density of information of the synthesized map data 912, an entropy of the synthesized map data 912, histograms of colors in the synthesized map data 912, histograms of adjacent colors in the synthesized map data 912, etc. A map statistic metric 920 may be calculated based on the map statistic(s) 914 calculated based on a difference between the synthesized map data 912 and target map statistic(s) 916, which may include at least one of target frequency components or spectra, a target average color, a target average brightness, target density of information, a target entropy, target histograms of colors, target histograms of adjacent colors, etc. The calculated map statistic metric 920 may be used to modify the loss function 940 such that the real/fake score 942 may incorporate map statistical information to penalize the discriminator model 830's output probability. Subsequently, the real/fake score 942 may be used to update the generator model 910 and the discriminator model 930.

Figure 10:
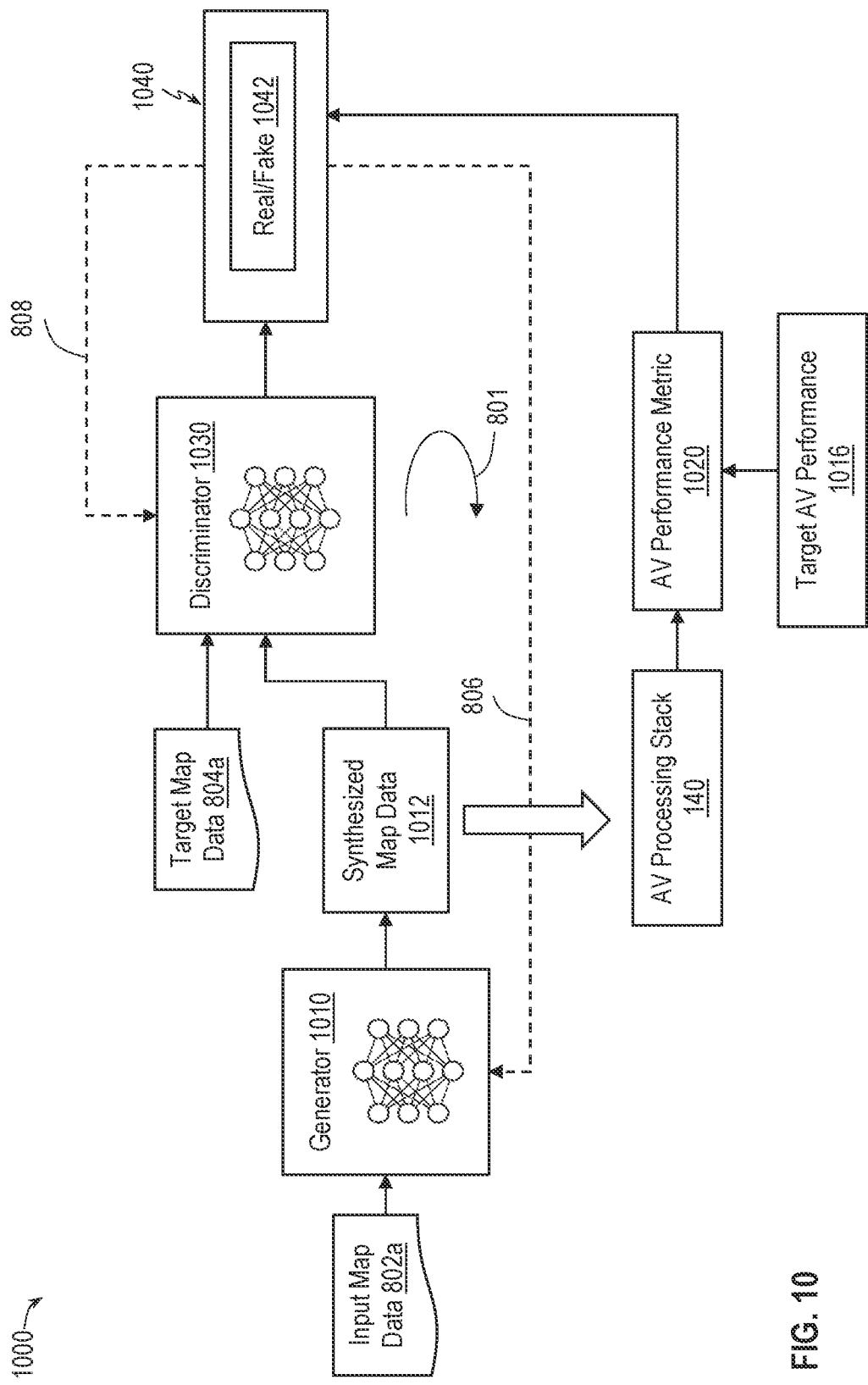
FIG. 10 provides an illustration of an exemplary GAN model for training a generator model for map adaptation, according to some embodiments of the present disclosure.

FIG. 10 provides an illustration of an exemplary GAN model 1000 for training a generator model 1010 for map adaptation, according to some embodiments of the present disclosure. For instance, the generator model 1010 may correspond to the ML model 510 of FIG. or the ML model 610 of FIG. 6, and the trained ML model 1010 can be deployed in the AV 110 for map adaptation as discussed above with reference to FIGS. 1-2, 5, and/or 6. The GAN model 900 may be implemented by a computer-implemented system (e.g., the system 1500 of FIG. 15).

The GAN model 1000 may be similar to the GAN models 800 and/or 900 in many respects. For example, the GAN model 1000 may include a generator model 1010 and a discriminator model 1030 having substantially the same architecture as the generator model 810 and/or 910 and the discriminator model 830 and/or 930, respectively, and may be trained in a closed loop 801 (to update the generator model 1010 and the discriminator model 1030) as discussed with reference to FIG. 8. Further, the GAN model 1000 may be trained using the first input map data 802a and corresponding target map data 804a. However, the discriminator model 1030 may be trained to discriminate between real/fake based on AV performance (e.g., run-time performance and/or driving performance) by modifying a loss function 1040 instead of based on map statistical information as in FIG. 9. That is, the GAN model 1000 may be trained in a way that synthesized map data 1012 generated by the generator model 1010 from the first input map data 802a may cause the AV 110 to have similar behaviors and/or performance (e.g., run-time performance and/or driving performance) as corresponding target map data 804a (e.g., HD map data).

As shown in FIG. 10, the generator model 1010 may process the first input map data 802a to output synthesized map data 1012. To train the discriminator model 1030 to discriminate real/fake based on AV performance, the synthesized map data 1012 may be processed by the AV processing stack 140. For example, the computer-implemented system may run a simulator implementing the same the operations as the AV processing stack 140 at the AV 110 and may determine a perception, a prediction, a plan, and/or a control using the synthesized map data 1012. An AV performance metric 1020 can be calculated based on the determined perception, a prediction, a plan, and/or a control in comparison to a target AV performance 1016. In some examples, the AV performance metric 1020 can be based on a response time of an AV in responding to a certain situation. In some examples, the AV performance metric 1020 can be based on one or more driving scenarios (e.g., 1, 2, 3, 4, 5, 6, 10, 20, 30, 40, 50 or more) and can be an average driving score. The AV performance metric 1020 may be used to modify the loss function 1040 such that the real/fake score 1042 may incorporate AV performance to penalize the discriminator 1030's output probability. Subsequently, the real/fake score 1042 may be used to update the generator model 1010 and the discriminator model 1030.

Example Map Adaptation and Associated ML Model Training Processes

Figure 11:
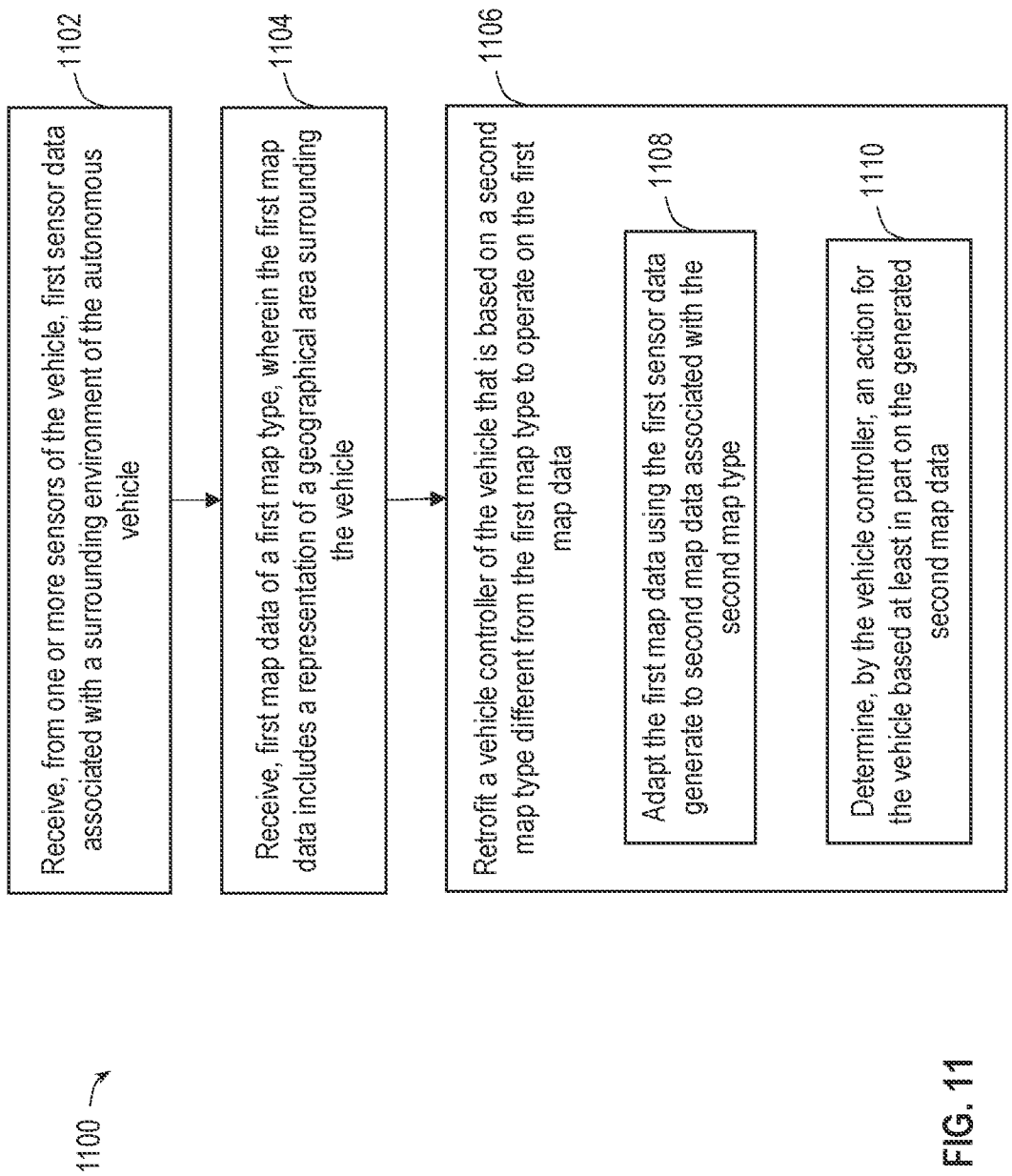
FIG. 11 is a flow diagram illustrating an exemplary process for map adaptation, according to some embodiments of the present disclosure.

FIG. 11 is a flow diagram illustrating an exemplary process 1100 for implementing map adaptation, according to some embodiments of the present disclosure. The process 1100 can be implemented by a computed-implemented system (e.g., the onboard computer 160 of FIG. 1 or the computer system 1500 of FIG. 15) at a vehicle (e.g., the AV 110). In general, the process 1100 may be performed using any suitable hardware components and/or software components. The process 1100 may utilize similar mechanisms as discussed above with reference to FIGS. 1-7. Operations are illustrated once each and in a particular order in FIG. 11, but the operations may be performed in parallel, reordered, and/or repeated as desired.

In some aspects, the computer-implement system may include memory storing instruction and one or more computer processors, where the instructions, when executed by the one or more computer processors, cause the one or more computer processors to perform the operations of the process 1100. In other aspects, the operations of the process 1100 may be in the form of instructions encoded in a non-transitory computable-readable storage medium that, when executed by one or more computer processors of the computer-implemented system, cause the one or more computer processors to perform the process 1100.

At 1102, sensor data associated with a surrounding environment of the vehicle may be received from one or more sensors (e.g., the sensor suite 150) of the vehicle. The sensor data may be similar to the sensor data 120, 302, 402, 502, and/or 608. The sensor data may include images, LIDAR data, RADAR data, etc.

At 1104, first map data of a first map type may be received (e.g., from a local map database of the vehicle or from a remote map database). The first map data may include a representation of a geographical area surrounding the vehicle. In some instances, the first map data may correspond to the first map data 122, 304, 404, 504, and/or 604 discussed above with reference to FIGS. 1-6.

At 1106, a vehicle controller of the vehicle that is based on a second map type different from the first map type may be retrofitted to operate on the first map data. For example, the vehicle controller may be designed, developed, trained, optimized, and/or tested to determine a perception, a prediction, a plan, and/or a control for the vehicle using map data of the second map type. The retrofitting may include performing operations at 1108 and 1110.

For instance, at 1108, the first map data of the first map type may be adapted using the sensor data to second map data associated with the second map type. That is, the second map data may be of a synthetic second map type (e.g., a third map type). In some aspects, the second map type may include at least one attribute that is absent from the first map type, and the at least one attribute may be associated with at least one of a map resolution, a map accuracy, or roadside object information (e.g., parking spots, lane boundaries and markings, intersections, crosswalks, road signs, traffic lights, traffic cones, etc.). In some instances, the generated second map data may correspond to the generated second map data 124, 308, 408, 508, and/or 612a discussed above with reference to FIGS. 1, 3, 4, 5, and/or 6, respectively. In some aspects, the first map type may correspond to an LD map type, and the second map type may correspond to an HD map type.

In some aspects, the adapting the first map data is responsive to a lack of availability of map data of the second map type for the geographical area surrounding the vehicle. In some aspects, the adapting the first map data is responsive to a comparison between a quality of the first map data of the first map type and quality of fourth map data of the second map type for the geographical area surrounding the vehicle.

At 1110, an action for the vehicle may be determined by the vehicle controller based at least in part on the generated second map data. In some instances, the vehicle controller may further determine action based on the first sensor data and location information associated with the vehicle. In some aspects, the vehicle controller may be configured for processing third map data of the second map type to determine at least one of a perception, a prediction, a plan, or a control for the vehicle.

In some aspects, the adapting the first map data at 1108 may include determining, based on the first sensor data, at least one object in the surrounding environment of the vehicle and generating the second map data by rendering the at least one determined object onto the first map data, for example, as discussed above with reference to FIGS. 2 and 3. The at least one determined object may be associated with the second map type and absent in the first map data.

In some aspects, the adapting the first map data at 1108 may include generating composite map data from the first map data and fourth map data (e.g., previously generated HD map), where the fourth map data may be generated based on fifth map data of the first map type and second sensor data different from the first sensor data. The adapting the first map data 1108 may further include determining at least one reference object by performing at least one of perception, prediction, planning, or control using the composite map data and the first sensor data. The adapting the first map data 1108 may further include generating the second map data using the first map data and the at least one reference object, for example, as discussed above with reference to FIG. 2.

In some aspects, the adapting the first map data at 1108 may include generating multiple possibilities of map data based on the first map data and the first sensor data and selecting one of the multiple possibilities of map data to generate the second map data, for example, as discussed above with reference to FIGS. 2 and 4-6. In other aspects, the adapting the first map data at 1108 may include generating the second map data by generating multiple possibilities of map data based on the first map data and the first sensor data, and the determining the action for the vehicle at 1110 may include processing each of the multiple possibilities of map data separately to generate a respective prediction and determining a plan for the vehicle based on a combination of at least some of the predictions and respective prediction confidence levels, for example, as discussed above with reference to FIGS. 2 and 4-6.

In some aspects, the determining the action for the vehicle at 1110 may include processing the first map data and the first sensor data to determine at least one of a first perception, a first prediction, a first plan, or a first control for the vehicle; and processing the generated second map data and the first sensor data to determine at least one of a second perception, a second prediction, a second plan, or a second control for the vehicle. The determining the action for the vehicle at 1110 may further include determining the action for the vehicle responsive to a comparison between the at least one of the first perception, the first prediction, the first plan, or the first control determined based on the first map data and the first sensor data; and the at least one of the second perception, the second prediction, the second plan, or the second control determined based on the generated second map data and the first sensor data, for example, as discussed above with reference to FIG. 2.

In some aspects, the adapting the first map data to the second map data at 1108 may include processing the sensor data, the first map data, and the location information of the vehicle using a ML model (e.g., the ML models 410, 510, and/or 610) to generate the second map data, for example, as discussed above with reference to FIGS. 4-6. In some aspects, the ML model may be trained as discussed above with reference to FIG. 7. In some aspects, the ML model may be a generator model trained jointly with a discriminator model in a GAN model as discussed above with reference to FIGS. 8-10. In some aspects, the ML model can be trained based on one or more criteria associated with at least one of a map data statistical measure (e.g., a frequency spectra, an average color, a brightness, an average brightness, histograms of colors, histograms of adjacent colors, etc.), a performance of the vehicle (e.g., a response time of the vehicle, a driving score for the vehicle in certain traffic scenario(s)), and/or a set of rules (e.g., driving rules or heuristic rules).

Figure 12:
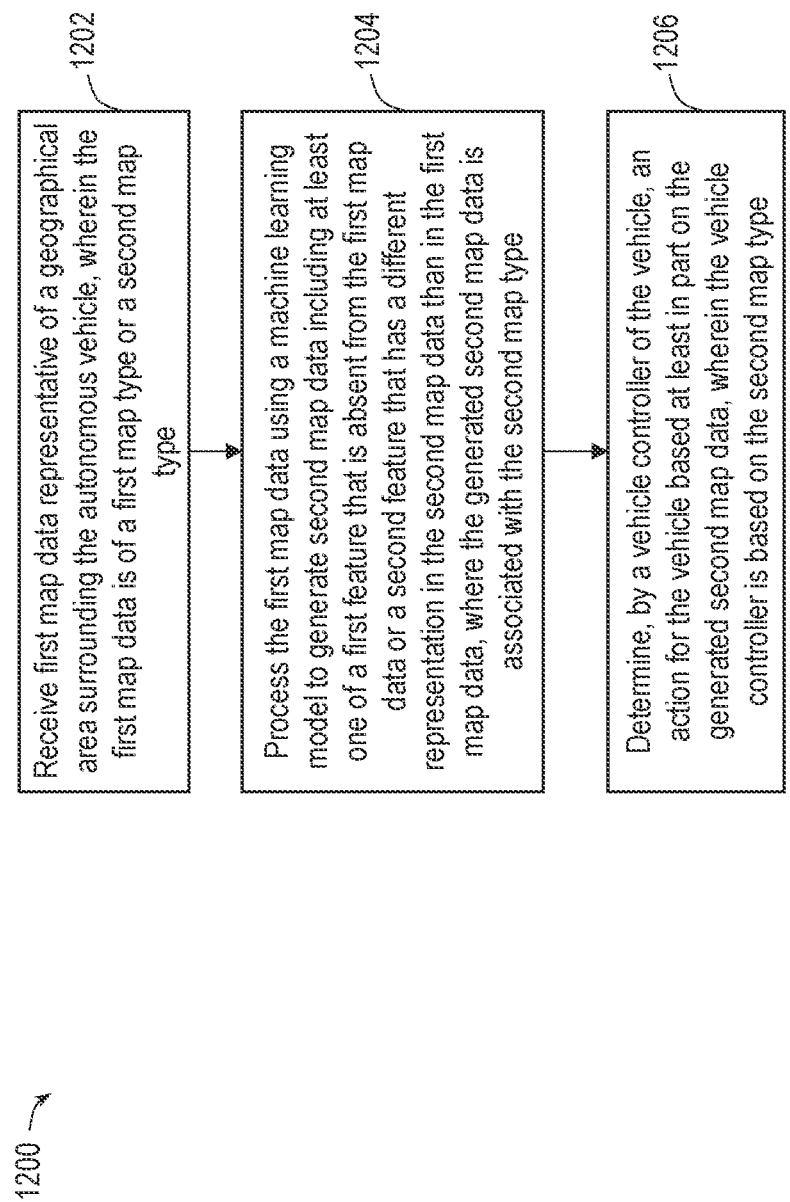
FIG. 12 is a flow diagram illustrating an exemplary process for map adaptation, according to some embodiments of the present disclosure.

FIG. 12 is a flow diagram illustrating an exemplary process 1200 for implementing map adaptation, according to some embodiments of the present disclosure. The process 1200 can be implemented by a computed-implemented system (e.g., the onboard computer 160 of FIG. 1 or the computer system 1500 of FIG. 15) at a vehicle (e.g., the AV 110). In general, the process 1200 may be performed using any suitable hardware components and/or software components. The process 1200 may utilize similar mechanisms as discussed above with reference to FIGS. 1-7 and 11. Operations are illustrated once each and in a particular order in FIG. 12, but the operations may be performed in parallel, reordered, and/or repeated as desired.

In some aspects, the computer-implement system may include memory storing instruction and one or more computer processors, where the instructions, when executed by the one or more computer processors, cause the one or more computer processors to perform the operations of the process 1200. In other aspects, the operations of the process 1200 may be in the form of instructions encoded in a non-transitory computable-readable storage medium that, when executed by one or more computer processors of the computer-implemented system, cause the one or more computer processors to perform the process 1200.

At 1202, first map data representative of a geographical area surrounding the vehicle may be received. The first map data may be of a first map type or a second map type different from the first map type.

At 1204, the first map data may be processed using a ML model (e.g., the ML models 410, 510, and/or 610) to generate second map data including at least one of a first feature that is absent from the first map data or a second feature that has a different representation in the second map data than in the first map data, where the generated second map data may be associated with the second map type.

In some aspects, the second map data may include the first feature associated with an unknown area in the first map data or an obstruction that is unidentifiable from sensor data captured by the vehicle. In other aspects, the second map data may include the second feature associated with at least one of a map resolution or a map accuracy that is different between the first map data and the second map data.

In some aspects, the ML model may be a generator model trained jointly with a discriminator model in a GAN model as discussed above with reference to FIG. 7. In some aspects, the ML model can be trained based on one or more criteria associated with at least one of a map data statistical measure (e.g., a frequency spectra, an average color, a brightness, an average brightness, histograms of colors, histograms of adjacent colors, etc.), a performance of the vehicle (e.g., a response time of the vehicle, a driving score for the vehicle in certain traffic scenario(s)), and/or a set of rules (e.g., driving rules or heuristic rules).

At 1206, an action may be determined, by a vehicle controller of the vehicle, for the vehicle based at least in part on the generated second map data. In some instances, the action may be determined further based location information associated with the vehicle. In some aspects, the vehicle controller used for determining the action for the vehicle may be associated with at least one of perception, prediction, planning, or control based on the second map type. For instance, the vehicle controller may implement at least one of a perception, prediction, planning, or control algorithms designed, developed, trained, optimized, and/or tested using map data of the second map type.

In some aspects, the process 1200 may further include receiving a map request, where the generating the second map data at 1204 may be responsive to the map request.

Figure 13:
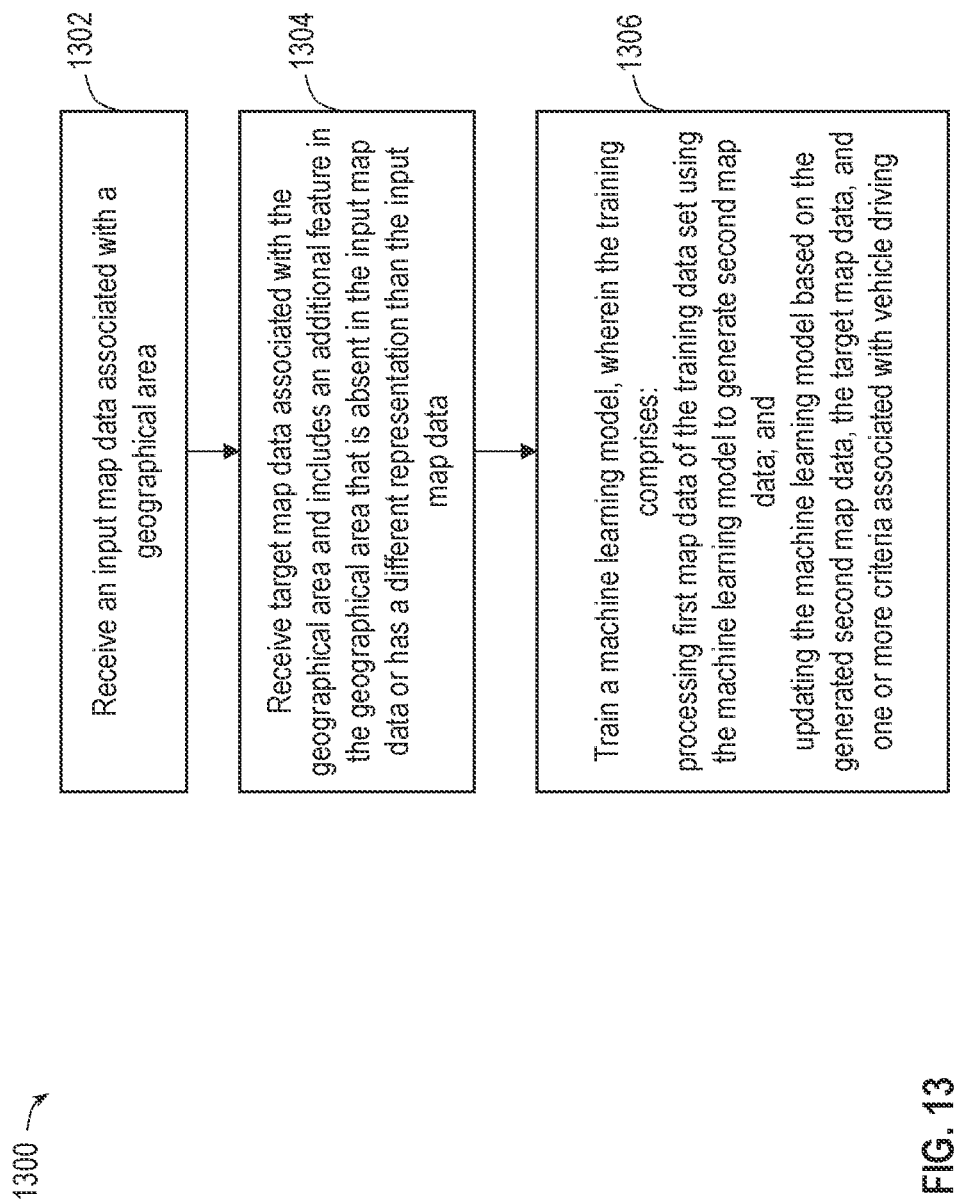
FIG. 13 is a flow diagram illustrating an exemplary process for training a machine learning (ML) model for map adaptation, according to some embodiments of the present disclosure.

FIG. 13 is a flow diagram illustrating an exemplary process 1300 for training an ML model for map adaptation, according to some embodiments of the present disclosure. The process 1300 can be implemented by a computed-implemented system (e.g., the computer system 1500 of FIG. 15). The process 1300 may utilize similar mechanisms as discussed above with reference to FIGS. 7-10. Operations are illustrated once each and in a particular order in FIG. 13, but the operations may be performed in parallel, reordered, and/or repeated as desired.

In some aspects, the computer-implement system may include memory storing instruction and one or more computer processors, where the instructions, when executed by the one or more computer processors, cause the one or more computer processors to perform the operations of the process 1300. In other aspects, the operations of the process 1300 may be in the form of instructions encoded in a non-transitory computable-readable storage medium that, when executed by one or more computer processors of the computer-implemented system, cause the one or more computer processors to perform the process 1300.

At 1302, input map data associated with a geographical area may be received.

At 1304, target map data associated with the same geographical area may be received. The target map data may include at least one additional feature in the geographical area that is absent in the input map data or has a different representation than the input map data. In some instances, the input map data may correspond to the input map data 704 and the target map data may correspond to the target map data 702 discussed above with reference to FIG. 7. In some instances, the input map data may correspond to the input map data 802 and the target map data may correspond to the target map data 804 as discussed above with reference to FIGS. 8-10.

In some aspects, the target map data may include the additional feature that is absent in the input map data, where the additional feature may be associated with at least one of a roadside object in the geographical area or a portion of the geographical area. In some aspects, the target map data may include the additional feature having the different representation than the input map data, where the additional feature may be associated with at least one of a map resolution or a map accuracy.

At 1306, an ML model (e.g., the ML models 410, 510, 610, 710, 800, 810, 830, 900, 910, 930, 1000, 1010, 1030) may be trained. The training may include processing the input map data using the ML model to generate second map data and updating the ML model based on the generated second map data. The target map data, and one or more criteria associated with driving. In some aspects, the ML model may be a GAN model including a generator model and a discriminator model, for example, as discussed above with reference to FIGS. 8-10. The training may include processing the input map data using the generator model to generate the second map data. The training may further include processing the second map data generated by the generator model and the target map data using the discriminator model. The training may further include updating at least one of the generator model or the discriminator model based on an output of the discriminator model. In some aspects, the one or more criteria for updating the ML model may be further associated with a map statistical measure (e.g., frequency components in the generated second map data and in the target map data, colors of the generated second map data and of the target map data, brightness of the generate second map data and of the target map data). In some aspects, the one or more criteria for updating the ML model may be further associated with a driving performance (e.g., a vehicle response time, a driving score).

In some aspects, the training may include determining a first map statistic for the generated second map data and updating the ML model further based on a comparison of the first map statistic to a target map statistic, for example, as discussed above with reference to FIG. 9.

In some aspects, the training may include performing at least one of perception, prediction, or planning operations associated with driving using the generated second map data to provide a first driving performance and updating the ML model further based on a comparison of the first driving performance measure to a target driving performance, for example, as discussed above with reference to FIG. 10.

Example AV

Figure 14:
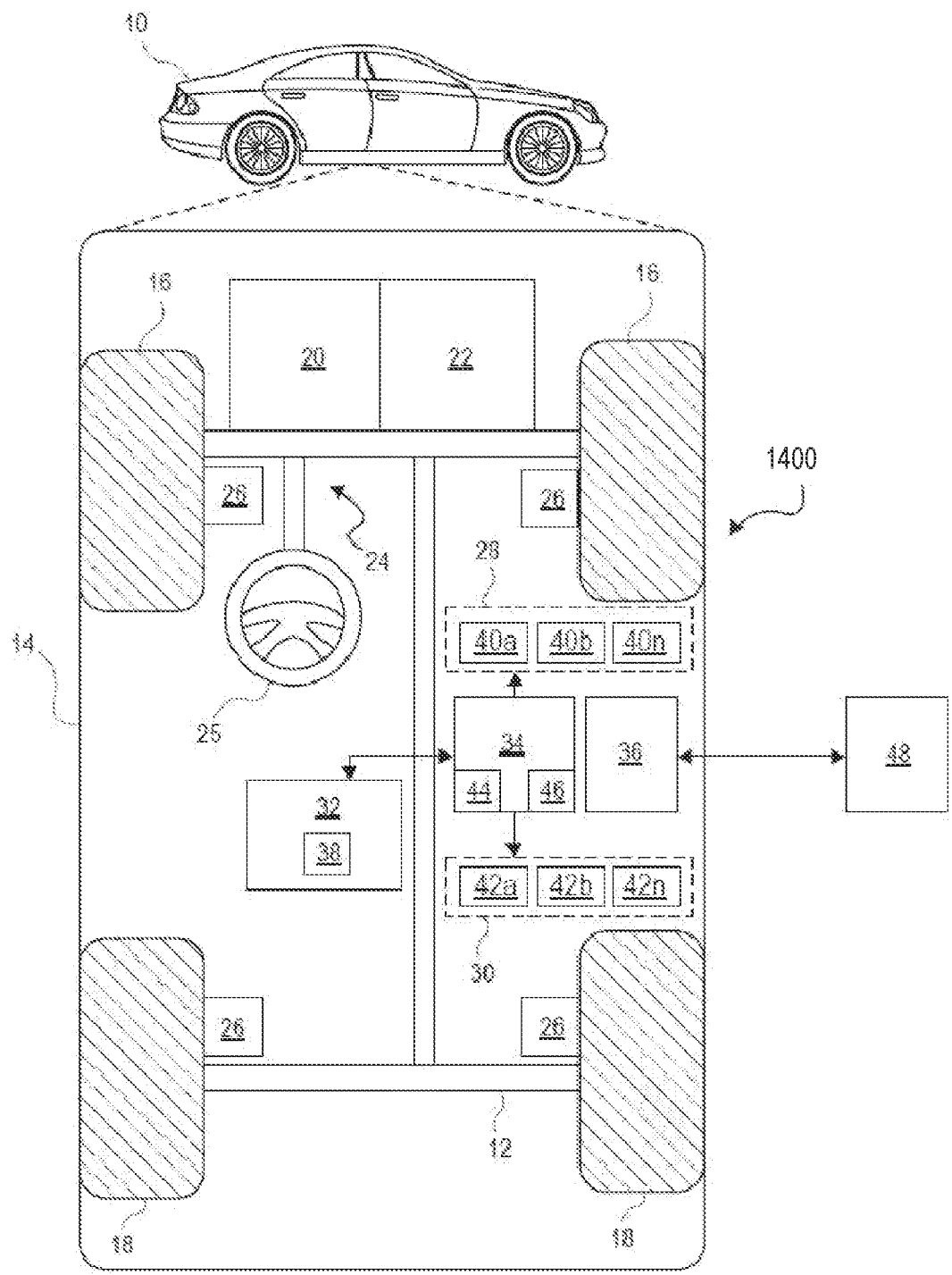
FIG. 14 illustrates an exemplary AV, according to some embodiments of the present disclosure.

FIG. 14 illustrates an exemplary AV 10, according to some embodiments of the present disclosure. In some aspects, the AV 10 may correspond to the AV 110 of FIG. 1.

As depicted in FIG. 14, the AV 10 may generally include a chassis 12, a body 14, front wheels 16, and rear wheels 18. The body 14 may be arranged on the chassis 12 and encloses components of the AV 10. The body 14 and the chassis 12 may jointly form a frame. The front wheels 16 and rear wheels 18 may be rotationally coupled to the chassis 12 near a respective corner of the body 14. In some examples, the chassis 12 may differ from the chassis on which the sensor arrays are mounted. For example, the sensor arrays can be mounted on the roof of the AV 10.

In various embodiments, the AV 10 may be an autonomous vehicle and the system 1400 and/or components thereof may be incorporated into the AV 10. The AV 10 may be, for example, a vehicle that may be automatically controlled to carry passengers and/or cargo from one location to another. While the AV 10 may be depicted as a passenger car in FIG. 1, any other vehicle, including motorcycles, trucks, sport utility vehicles (SUVs), recreational vehicles (RVs), marine vessels, aircraft, and the like, can also be used as an autonomous vehicle.

In an example, the AV 10 may correspond to a level four or level five automation system under the Society of Automotive Engineers (SAE) "J3016" standard taxonomy of automated driving levels. Using this terminology, a level four system may indicate "high automation," referring to a driving mode in which the automated driving system performs aspects of the dynamic driving task, even if a human driver does not respond appropriately to a request to intervene. A level five system may indicate "full automation," referring to a driving mode in which the automated driving system performs aspects of the dynamic driving task under roadway and environmental conditions that can be managed by a human driver. Implementations in accordance with the present subject matter are not limited to any taxonomy or rubric of automation categories. Furthermore, systems in accordance with the present disclosure can be used in conjunction with any autonomous or other vehicle that utilizes a navigation system and/or other systems to provide route guidance.

As shown, the AV 10 may generally include a propulsion system 20, a transmission system 22, a steering system 24, a brake system 26, a sensor system 28, an actuator system 30, data storage device 32, controller 34, and a communication system 36. The propulsion system 20 can, in various embodiments, include an internal combustion engine, an electric machine such as a traction motor, and/or a fuel cell propulsion system. The transmission system 22 may be configured to transmit power from the propulsion system 20 to the front wheels 16 and rear wheels 18 according to selectable speed ratios. According to various implementations, the transmission system 22 can include a step-ratio automatic transmission, a continuously-variable transmission, or other appropriate transmission.

The brake system 26 may be configured to provide braking torque to the front wheels 16 and rear wheels 18. Brake system 26 can, in various embodiments, include friction brakes, brake by wire, a regenerative braking system such as an electric machine, and/or other appropriate braking systems.

The steering system 24 may influence a position of the front wheels 16 and/or rear wheels 18. While depicted as including a steering wheel 25 for illustrative purposes, in some embodiments contemplated within the scope of the present disclosure, the steering system 24 may not include a steering wheel.

The sensor system 28 may include one or more sensing devices 40a-40n that sense observable conditions of the exterior environment and/or the interior environment of the AV 10. The sensing devices 40a-40n can include RADAR sensors, LIDAR sensors, GPSs, optical cameras, thermal cameras, time-of-flight (TOF) cameras, ultrasonic sensors, speedometers, compasses, and/or other sensors.

The actuator system 30 may include one or more actuator devices 42a-42n that control one or more vehicle features such as the propulsion system 20, the transmission system 22, the steering system 24, and the brake system 26. In various embodiments, the AV 10 can also include interior and/or exterior vehicle features not illustrated in FIG. 14, such as various doors, a trunk, and cabin features such as air conditioning, music players, lighting, touch-screen display components (such as those used in connection with navigation systems), and the like.

The data storage device 32 may store data for use in automatically controlling the AV 10. In various implementations, the data storage device 32 may store defined maps of the navigable environment. In various implementations, the defined maps may be predefined by and obtained from a remote system. For example, the defined maps may be assembled by the remote system and communicated to the AV 10 (wirelessly and/or in a wired manner) and stored in the data storage device 32. Route information can also be stored within the data storage device 32— i.e., a set of road segments (associated geographically with one or more of the defined maps) that together define a route that the user might take to travel from a start location (e.g., the user's current location) to a target location. Also, in various implementations, the data storage device 32 may store ML models 38 that are trained to facilitate autonomous driving. In some aspects, the ML models 38 may correspond to the ML models 410, 510, and/or 610 discussed above with reference to FIGS. 4, 5, and/or 6, respectively.

In general, the data storage device 32 may include any suitable volatile or non-volatile memory technology, including double data rate (DDR) random access memory (RAM), synchronous RAM (SRAM), dynamic RAM (DRAM), flash, read-only memory (ROM), optical media, virtual memory regions, magnetic or tape memory, or any other suitable technology. Unless specified otherwise, any data storage devices or memory elements discussed herein should be construed as being encompassed within the broad term "memory." As will be appreciated, the data storage device 32 can be part of the controller 34, separate from the controller 34, or part of the controller 34 and part of a separate system.

The controller 34 may include a processor 44 and a computer-readable storage device or media 46. The processor 44 can be any custom-made or commercially available processor, a central processing unit (CPU), a graphics processing unit (GPU), an auxiliary processor among several processors associated with the controller 34, a semiconductor-based microprocessor (in the form of a microchip or chip set), any combination thereof, or generally any device for executing computer instructions. The computer-readable storage device or media 46 can include volatile and non-volatile storage in ROM, RAM, and keep-alive memory (KAM), for example. KAM may be a persistent or non-volatile memory that can store various operating variables while the processor 44 is powered down. The computer-readable storage device or media 46 can be implemented using any of a number of memory devices such as PROMs (programmable read-only memory), EPROMs (electrically PROM), EEPROMs (electrically erasable PROM), flash memory, or any other electric, magnetic, optical, resistive, or combination memory devices capable of storing data, some of which represent executable instructions, used by the controller 34 in controlling the AV 10. As will be appreciated, while the computer-readable storage device or media 46 is depicted in FIG. 14 as part of the controller 34, the computer-readable storage device or media 46 can be part of the data storage device 32.

The instructions can include one or more separate programs that comprise an ordered listing of executable instructions for implementing logical functions. The instructions, when executed by the processor 44, can receive and process signals from the sensor system 28, perform logic, calculations, methods and/or algorithms for automatically controlling the components of the AV 10, and generate control signals transmitted to the actuator system 30 to control the components of the AV 10 based on the logic, calculations, methods, and/or algorithms. Although one controller 34 is shown in FIG. 14, embodiments of the AV 10 can include any number of controllers 34 that communicate over any suitable communication medium or a combination of communication mediums and that cooperate to process the sensor signals, perform logic, calculations, methods, and/or algorithms, and generate control signals to control features of the AV 10.

The communication system 36 may wirelessly communicates information to and from other entities 48, such as other vehicles ("V2V" communication), infrastructure ("V2I" communication), remote transportation systems, and/or user devices. In an example, the communication system 36 may be a wireless communication system configured to communicate via a wireless local area network (WLAN) using Institute of Electrical and Electronics Engineers (IEEE) 802.11 standards or by using cellular data communication (e.g., fifth-generation (5G) under the third Generation Partnership Project (3GPP)). Additional or alternate communication methods, such as a dedicated short-range communications (DSRC) channel, may also considered within the scope of the present disclosure. DSRC channels may refer to one-way or two-way short-range to medium-range wireless communication channels specifically designed for automotive use and a corresponding set of protocols and standards.

Example Computed-Implemented System

FIG. 15 illustrates components of a computing system 1500 used in implementations described herein. In some embodiments, the components of FIG. 15 can be present in a vehicle or an AV (e.g., the AV 10 of FIG. 14 and/or the AV 110 of FIG. 1). In other embodiments, the components of FIG. 15 can be present in an infrastructure system for AV.

Referring to FIG. 15, system 1500 can be implemented within one computing device or distributed across multiple computing devices or subsystems that cooperate in executing program instructions. In some implementations, the system 1500 can include one or more blade server devices, standalone server devices, personal computers, routers, hubs, switches, bridges, firewall devices, intrusion detection devices, mainframe computers, network-attached storage devices, smartphones and other mobile telephones, and other computing devices. The system hardware can be configured according to any suitable computer architectures such as a Symmetric Multi-Processing (SMP) architecture or a Non-Uniform Memory Access (NUMA) architecture.

The system 1500 can include one or more processing units 1520, which can include one or more hardware processors and/or other circuitry that retrieves and executes instructions 1512 (e.g., software or firmware codes) from memory 1510. The one or more processing units 1520 can be implemented within one processing device, chip, or package and can also be distributed across multiple processing devices, chips, packages, or subsystems that cooperate in executing program instructions. In one implementation, the one or more processing units 1520 may include a CPU and a GPU. The GPU can execute the visual/image processing in the computing system. The GPU, or any second-order processing element independent from CPU dedicated to processing imagery and other perception data in real or near real-time, can provide a significant benefit.

The memory 1510 can include any computer-readable storage media readable by one or more processing unit(s) 1520 and that stores instructions 1512. The memory 1510 can be implemented as one storage device and can also be implemented across multiple co-located or distributed storage devices or subsystems. The memory 1510 can include additional elements, such as a controller, that communicate with the one or more processing units 1520. The memory 1510 can also include storage devices and/or subsystems on which data and/or instructions may be stored. System 1500 can access one or more storage resources to access information to carry out any of the processes indicated by instructions 1512.

The instructions 1512, including routines for at least partially performing at least one of the processes illustrated in FIGS. 1-14, can be implemented in program instructions. Further, the instructions 1512, when executed by system 1500 in general or the one or more processing unit(s) 1520 in particular, can direct, among other functions, the system 1500 or the one or more processing units 1520 to operate as described herein.

In some embodiments, the system 1500 may further include a map adaptor 1514 and a vehicle controller 1516, for example, when the system 1500 is part of an AV such as the AV 110 of FIG. 1 and/or the AV 10 of FIG. 14. Each of the map adaptor 1514 and the vehicle controller 1516 can include hardware and/or software components. In some examples, the map adaptor 1514 and the vehicle controller 1516 can be implemented as part of the one or more processing unit(s) 1520. The map adaptor 1514 may adapt map data from one map type (e.g., HD map type) to another map type (e.g., a non-HD map type or LD map type) as discussed herein, and the vehicle controller 1516 may be retrofitted to perform AV processing including perception, prediction, planning, and/or control as discussed herein.

In implementations where the system 1500 may include multiple computing devices, the server can use one or more communications networks that facilitate communication among the computing devices. For example, the one or more communications networks can include or be a local or wide area network that facilitates communication among the computing devices. One or more direct communication links can be included between the computing devices. In addition, the computing devices can be installed at geographically distributed locations or at one geographic location, such as a server farm or an office.

System 1500 can include a communications interface 1530 that provides one or more communication connections and/or one or more devices that allow for communication between system 1500 and other computing systems (not shown) over a communication network or collection of networks (not shown) or the air.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Selected Examples

Example 1 includes a method performed by a vehicle, the method including receiving, from one or more sensors of the vehicle, first sensor data associated with a surrounding environment of the vehicle; receiving first map data of a first map type, where the first map data includes a representation of a geographical area surrounding the vehicle; retrofitting a vehicle controller of the vehicle that is based on a second map type different from the first map type to operate on the first map data, wherein the retrofitting includes adapting the first map data using the first sensor data to generate second map data associated with the; and determining, by the vehicle controller, an action for the vehicle based at least in part on the generated second map data.

In Example 2, the method of Example 1 can optionally include where the second map type includes at least one attribute that is absent from the first map type, and where the at least one attribute is associated with at least one of a map resolution, a map accuracy, or roadside object information.

In Example 3, the method of any of Examples 1-2 can optionally include where the adapting the first map data is responsive to a lack of availability of map data of the second map type for the geographical area surrounding the vehicle.

In Example 4, the method of any of Examples 1-3 can optionally include where the adapting the first map data is responsive to a comparison between a quality of the first map data of the first map type and quality of fourth map data of the second map type for the geographical area surrounding the vehicle.

In Example 5, the method of any of Examples 1~4 can optionally include where the adapting the first map data includes determining, based on the first sensor data, at least one object in the surrounding environment of the vehicle, where the at least one determined object is associated with the second map type and absent in the first map data; and generating the second map data by rendering the at least one determined object onto the first map data.

In Example 6, the method of any of Examples 1-5 can optionally include where the adapting the first map data includes generating composite map data from the first map data and fourth map data, the fourth map data generated based on fifth map data of the first map type and second sensor data different from the first sensor data; determining at least one reference object by performing at least one of perception, prediction, planning, or control using the composite map data and the first sensor data; and generating the second map data using the first map data and the at least one reference object.

In Example 7, the method of any of Examples 1-6 can optionally include where the adapting the first map data includes generating multiple possibilities of map data based on the first map data and the first sensor data; and selecting one of the multiple possibilities of map data to generate the second map data.

In Example 8, the method of any of Examples 1-7 can optionally include where the adapting the first map data includes generating the second map data by generating multiple possibilities of map data based on the first map data and the first sensor data; and the determining the action for the vehicle includes processing each of the multiple possibilities of map data separately to generate a respective prediction; and determining a plan for the vehicle based on a combination of at least some of the predictions and respective prediction confidence levels.

In Example 9, the method of any of Examples 1-8 can optionally include where the determining an action for the vehicle includes processing the first map data and the first sensor data to determine at least one of a first perception, a first prediction, a first plan, or a first control for the vehicle; processing the generated second map data and the first sensor data to determine at least one of a second perception, a second prediction, a second plan, or a second control for the vehicle; determining the action for the vehicle responsive to a comparison between the at least one of the first perception, the first prediction, the first plan, or the first control determined based on the first map data and the first sensor data; and the at least one of the second perception, the second prediction, the second plan, or the second control determined based on the generated second map data and the first sensor data.

In Example 10, the method of any of Examples 1-9 can optionally include where the adapting the first map data includes processing the first sensor data and the first map data using a machine learning model to generate the second map data.

In Example 11, the method of any of Examples 1-10 can optionally include where the machine learning model is a generator model trained jointly with a discriminator model in a generative adversarial network (GAN).

In Example 12, the method of any of Examples 1-11 can optionally include where the machine learning model is trained based on one or more criteria associated with at least one of a map data statistical measure or a performance of the vehicle.

In Example 13, the method of any of Examples 1-12 can optionally include where the vehicle controller used for determining the action for the vehicle is associated with at least one of perception, prediction, planning, or control based on the second map type.

Example 14 includes a vehicle including one or more sensors to collect first sensor data associated with a surrounding environment of the vehicle; a map adaptor to receive first map data of a first map type, where the first map data includes a representation of a geographical area surrounding the vehicle; and adapt the first map data using the first sensor data to generate second map data associated with a second map type different from the first map type; and a vehicle controller to determine an action for the vehicle based at least in part on the generated second map data, where the vehicle controller operates based on the second map type.

In Example 15, the vehicle of Example 14 can optionally include where the second map type includes at least one attribute that is absent from the first map type, and where the at least one attribute is associated with at least one of a map resolution, a map accuracy, or roadside object information.

In Example 16, the vehicle of any of Examples 14-15 can optionally include where the map adaptor adapts the first map data in response to a lack of availability of map data of the second map type for the geographical area surrounding the vehicle.

In Example 17, the vehicle any of Examples 14-16 can optionally include where the map adaptor adapts in responsive to a comparison between a quality of the first map data of the first map type and quality of fourth map data of the second map type for the geographical area surrounding the vehicle.

In Example 18, the vehicle any of Examples 14-17 can optionally include where the map adaptor adapts the first map data by determining, based on the first sensor data, at least one object in the surrounding environment of the vehicle, where the at least one determined object is associated with the second map type and absent in the first map data; and generating the second map data by rendering the at least one determined object onto the first map data.

In Example 19, the vehicle any of Examples 14-18 can optionally include where the map adaptor adapts the first map data by processing the first sensor data and the first map data using a machine learning model to generate the second map data.

Example 20 can include one or more non-transitory, computer-readable media encoded with instructions that, when executed by one or more processing units, perform a method including receiving input map data associated with a geographical area; receiving target map data associated with the geographical area and including at least one additional feature in the geographical area that is absent in the input map data or has a different representation than the input map data; and training a machine learning model, where the training includes processing the input map data using the machine learning model to generate second map data; and updating the machine learning model based on the generated second map data, the target map data, and one or more criteria associated with driving.

In Example 21, the one or more non-transitory, computer-readable media of Example 20 can optionally include where the target map data includes the additional feature that is absent in the input map data, the additional feature associated with at least one of a roadside object in the geographical area or a portion of the geographical area.

In Example 22, the one or more non-transitory, computer-readable media of any of Examples 20-21 can optionally include where the target map data includes the additional feature having the different representation than the input map data, the additional feature associated with at least one of a map resolution or a map accuracy.

In Example 23, the one or more non-transitory, computer-readable media of any of Examples 20-22 can optionally include where the machine learning model is a generative adversarial network (GAN) model including a generator model and a discriminator model, where the training includes processing the input map data using the generator model to generate the second map data; processing the second map data generated by the generator model and the target map data using the discriminator model; and updating at least one of the generator model or the discriminator model based on an output of the discriminator model.

In Example 24, the one or more non-transitory, computer-readable media of any of Examples 20-23 can optionally include where the one or more criteria for updating the machine learning model is further associated with at least one of a map statistic or a driving performance.

In Example 25, the one or more non-transitory, computer-readable media of any of Examples 20-24 can optionally include where the training the machine learning model further includes determining a first map statistic for the generated second map data; and updating the machine learning model further based on a comparison of the first map statistic to a target map statistic.

In Example 26, the one or more non-transitory, computer-readable media of any of Examples 20-25 can optionally include where the training the machine learning model further includes performing at least one of perception, prediction, or planning operations associated with driving using the generated second map data to provide a first driving performance; and updating the machine learning model further based on a comparison of the first driving performance measure to a target driving performance.

Example 27 includes a method performed by a vehicle, the method including receiving first map data representative of a geographical area surrounding the autonomous vehicle, where the first map data is of a first map type or a second map type; processing the first map data using a machine learning model to generate second map data including at least one of a first feature that is absent from the first map data or a second feature that has a different representation in the second map data than in the first map data, where the second map data is of the second map type; and determining, by a vehicle controller of the autonomous vehicle, an action for the autonomous vehicle based on the second map data and location information associated with the autonomous vehicle, where the vehicle controller is based on the second map type.

In Example 28, the method of Example 27 can optionally include where the second map data includes the first feature associated with an unknown area in the first map data or an obstruction that is unidentifiable from sensor data captured by the autonomous vehicle.

In Example 29, the method of any of Examples 27-28 can optionally include where the second map data includes the second feature associated with at least one of a map resolution or a map accuracy that is different between the first map data and the second map data.

In Example 30, the method of any of Examples 27-29 can optionally include where the machine learning model is a generator model trained jointly with a discriminator model in a generative adversarial network (GAN).

In Example 31, the method of any of Examples 27-30 can optionally include where the machine learning model is trained based on one or more criteria associated with at least one of a map data statistical measure or a performance of the autonomous vehicle.

In Example 32, the method of any of Examples 27-31 can optionally include further including receiving a map request, where the adapting the first map data to the second map data is responsive to the map request.

In Example 33, the method of any of Examples 27-32 can optionally include where the vehicle controller used for determining the action for the autonomous vehicle is associated with at least one of perception, prediction, or planning based on the second map type.

Variations and Implementations

As will be appreciated by one skilled in the art, aspects of the present disclosure, in particular, aspects of using the generator model to add elements to and/or modify elements in a scene and using the discriminator model to classify an object from a scene, described herein, can be embodied in various manners (e.g., as a method, a system, a computer program product, or a computer-readable storage medium). Accordingly, aspects of the present disclosure can take the form of a hardware implementation, a software implementation (including firmware, resident software, or microcode) or an implementation combining software and hardware aspects that can generally be referred to herein as a "circuit," "module," "component" or "system." Functions described in this disclosure can be implemented as an algorithm executed by one or more hardware processing units, e.g. one or more microprocessors of one or more computers. In various embodiments, different steps and portions of the operations of the methods described herein can be performed by different processing units. Furthermore, aspects of the present disclosure can take the form of a computer program product embodied in one or more computer-readable media having computer-readable program code embodied, e.g., stored or encoded, thereon. In various embodiments, such a computer program can, for example, be downloaded (or updated) to the existing devices and systems or be stored upon manufacturing of these devices and systems.

The foregoing disclosure presents various descriptions of certain specific embodiments. The innovations described herein can be embodied in a multitude of different ways, for example, as defined and covered by the claims and/or select examples. In the following description, reference is made to the drawings where like reference numerals can indicate identical or functionally similar elements. Elements illustrated in the drawings are not necessarily drawn to scale. Additionally, certain embodiments can include more elements than illustrated in a drawing and/or a subset of the elements illustrated in a drawing. Further, some embodiments can incorporate any suitable combination of features from two or more drawings.

The foregoing disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. Numerous implementation-specific decisions might be made to achieve the developer's specific goals, including compliance with system, business, and/or legal constraints, which may vary from one implementation to another. Additionally, while such a development effort might be complex and time-consuming; it would be a routine undertaking for those of ordinary skill in the art having the benefit of this disclosure.

In the Specification, reference might be made to spatial relationships between various components and to the spatial orientation of various aspects of components as depicted in the attached drawings. As will be recognized by those skilled in the art after a complete reading of the present disclosure, the devices, components, members, and apparatuses described herein can be positioned in any orientation. Thus, the use of terms such as "above", "below", "upper", "lower", "top", "bottom", or other similar terms to describe a spatial relationship between various components or to describe the spatial orientation of aspects of such components, describe a relative relationship between the components or a spatial orientation of aspects of such components, respectively, as the components described herein can be oriented in any direction. When used to describe a range of dimensions or other characteristics (e.g., time, pressure, temperature, length, width, etc.) of an element, operations, and/or conditions, the phrase "between X and Y" represents a range that includes X and Y.

Other features and advantages of the disclosure will be apparent from the description and the claims. Note that all optional features of the apparatus described above may also be implemented with respect to the method or process described herein and specifics in the examples may be used anywhere in one or more embodiments.

The 'means for' in these instances (above) can include (but is not limited to) using any suitable component discussed herein, along with any suitable software, circuitry, hub, computer code, logic, algorithms, hardware, controller, interface, link, bus, communication pathway, etc. In a second example, the system includes memory that further comprises machine-readable instructions that when executed cause the system to perform any of the activities discussed above.

In addition, the terms "storage media," "computer-readable storage media," or "computer-readable storage medium" can refer to non-transitory storage media, such as a hard drive, a memory chip, and cache memory, and to transitory storage media, such as carrier waves or propagating signals.

Further, the terms "comprise," "comprising," "include," "including," "have," "having" or any other variation thereof, are intended to cover a non-exclusive inclusion. For example, a method, process, device, or system that comprises a list of elements is not necessarily limited to only those elements but may include other elements not expressly listed or inherent to such method, process, device, or system. Also, the term "or" refers to an inclusive or and not to an exclusive or.

In one example embodiment, any number of electrical circuits of the FIGS. can be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.) and computer-readable, non-transitory memory elements can be coupled to the board based on particular configurations, processing demands, or computer designs. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

It is also imperative to note that all of the specifications, dimensions, and relationships outlined herein (e.g., the number of processors, logic operations, etc.) have been offered for purposes of example and teaching. Such information can be varied considerably, as the specifications apply to non-limiting examples. In the foregoing description, example implementations have been described with reference to particular arrangements of components. Various modifications and changes can be made to such implementations. The description and drawings are, accordingly, to be regarded in an illustrative sense and not in a restrictive sense.

With the numerous examples provided herein, interaction may be described in terms of two, three, four, or more electrical components for purposes of clarity and example. The system can be consolidated in any suitable manner. Along similar design alternatives, any of the illustrated components, modules, and elements of the FIGS. can be combined in various possible configurations within the scope of this disclosure. In certain cases, it might be easier to describe one or more of the functionalities of a given set of flows by referencing a limited number of electrical elements. The electrical circuits of the FIGS. and their teachings are readily scalable and can accommodate many components, as well as more complicated/sophisticated arrangements and configurations. Accordingly, the examples provided do not limit the scope or inhibit the teachings of the electrical circuits as potentially applied to a myriad of other architectures.

Note that in this Specification, references to various features (e.g., elements, structures, modules, components, steps, operations, characteristics, etc.) included in "one implementation", "example implementation", "an implementation", "another implementation", "some implementations", "various implementations", "other implementations", "alternative implementation", and the like are intended to mean that any such features are included in one or more implementations of the present disclosure and might not necessarily be combined in the same embodiments.

Note that the functions related to using the generator model to add elements to and/or modify elements in a scene and using the discriminator model to classify an object from a scene, e.g. those summarized in the one or more processes shown in FIGS., illustrate some of the possible functions that can be executed by, or within, the systems illustrated in the FIGS. Some of these operations can be deleted or omitted where appropriate, or these operations can be modified or changed considerably. In addition, the timing of these operations can be altered considerably. The preceding operational flows have been offered for purposes of example and discussion. Implementations described herein provide flexibility, in that any suitable arrangements, chronologies, configurations, and timing mechanisms can be provided.

Numerous other changes, substitutions, variations, alterations, and modifications might be ascertained by one skilled in the art, and the present disclosure encompasses such changes, substitutions, variations, alterations, and modifications as falling within the scope of the appended claims. Optional features of the apparatus described above can be implemented with respect to the method or process described herein and specifics in the examples can be used anywhere in one or more embodiments.

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

What is claimed is:

1. A method performed by a vehicle, the method comprising:
    receiving, from one or more sensors of the vehicle, first sensor data associated with a surrounding environment of the vehicle;
    receiving first map data of a first map type, wherein the first map data includes a representation of a geographical area surrounding the vehicle;
    retrofitting a vehicle controller of the vehicle that is based on a second map type different from the first map type to operate on the first map data, wherein the retrofitting comprises:
    adapting the first map data using the first sensor data to generate second map data associated with the second map type, the adaption including identifying at least one object in the first map data using an object detection module, generating semantics for the object using an object-semantic generation sub-module, identifying a high definition (HD) object in an HD object library, wherein the HD object corresponds to the semantic model of the object, and replacing the semantic model of the object with an HD object using an object semantic to HD object replacement (OSHDOR) sub-module;
    determining, by the vehicle controller, an action for the vehicle based at least in part on the generated second map data, wherein the action for the vehicle is a planned vehicle maneuver; and
    using a control module of the vehicle controller, implementing the planned vehicle maneuver by outputting control instructions to at least one movement subsystem of the vehicle.

2. The method of claim 1, wherein the second map type includes at least one attribute that is absent from the first map type, and wherein the at least one attribute is associated with at least one of a map resolution, a map accuracy, or roadside object information.

3. The method of claim 1, wherein the adapting the first map data is responsive to a lack of availability of map data of the second map type for the geographical area surrounding the vehicle.

4. The method of claim 1, wherein the adapting the first map data is responsive to a comparison between a quality of the first map data of the first map type and quality of fourth map data of the second map type for the geographical area surrounding the vehicle.

5. The method of claim 1, wherein the adapting the first map data comprises:
    determining, based on the first sensor data, at least one object in the surrounding environment of the vehicle, wherein the at least one determined object is associated with the second map type and absent in the first map data; and
    generating the second map data by rendering the at least one determined object onto the first map data.

6. The method of claim 1, wherein the adapting the first map data comprises:
    generating composite map data from the first map data and fourth map data, the fourth map data generated based on fifth map data of the first map type and second sensor data different from the first sensor data;
    determining at least one reference object by performing at least one of perception, prediction, planning, or control using the composite map data and the first sensor data; and
    generating the second map data using the first map data and the at least one reference object.

7. The method of claim 1, wherein the adapting the first map data comprises:
    generating multiple possibilities of map data based on the first map data and the first sensor data; and
    selecting one of the multiple possibilities of map data to generate the second map data.

8. The method of claim 1, wherein:
the adapting the first map data comprises:
generating the second map data by generating multiple possibilities of map data based on the first map data and the first sensor data; and
the determining the action for the vehicle comprises:
processing each of the multiple possibilities of map data separately to generate a respective prediction; and
determining a plan for the vehicle based on a combination of at least one of the predictions and the respective prediction confidence levels.

9. The method of claim 1, wherein the determining an action for the vehicle comprises:
processing the first map data and the first sensor data to determine at least one of a first perception, a first prediction, a first plan, or a first control for the vehicle;
processing the generated second map data and the first sensor data to determine at least one of a second perception, a second prediction, a second plan, or a second control for the vehicle; and
determining the action for the vehicle responsive to a comparison between:
the at least one of the first perception, the first prediction, the first plan, or the first control determined based on the first map data and the first sensor data; and
the at least one of the second perception, the second prediction, the second plan, or the second control determined based on the generated second map data and the first sensor data.

10. The method of claim 1, wherein the object-semantic generation sub-module adds semantic information to a detected object of the first map, thereby generating intermediate map data.

11. The method of claim 10, wherein the semantic information includes a location of the detected object with respect to a current location of the vehicle.

12. The method of claim 11, wherein the object-semantic generation sub-module further adds object labels to the intermediate map data according to the determined location of the object with respect to the current location of the vehicle.

13. The method of claim 10, wherein the OSHDOR sub-module replaces the object labels in the intermediate map data with corresponding HD representations of the detected object of the first map from an HD object library, thereby generating the second map data.

14. A vehicle comprising:
one or more sensors configured to collect first sensor data associated with a surrounding environment of the vehicle;
a map adaptor to:
receive first map data of a first map type, wherein the first map data includes a representation of a geographical area surrounding the vehicle; and
adapt the first map data using the first sensor data to generate second map data associated with a second map type different from the first map type, the adaption including identifying at least one object in the first map data using an object detection module, generating a semantic model of the object using an object-semantic generation sub-module, identifying a high definition (HD) object in an HD object library, the corresponding HD object corresponding to the semantic model of the object, and replacing the semantic model of the object with an HD object using an object semantic to HD object replacement (OSHDOR) sub-module;
a vehicle controller configured to determine an action for the vehicle based at least in part on the generated second map data, wherein the vehicle controller operates based on the second map type, wherein the action for the vehicle is a planned vehicle maneuver; and
using a control module of the vehicle controller, implementing the planned vehicle maneuver by outputting control instructions to at least one movement subsystem of the vehicle.

15. The vehicle of claim 14, wherein the second map type includes at least one attribute that is absent from the first map type, and wherein the at least one attribute is associated with at least one of a map resolution, a map accuracy, or roadside object information.

16. The vehicle of claim 14, wherein the map adaptor adapts the first map data by:
determining, based on the first sensor data, at least one object in the surrounding environment of the vehicle, wherein the at least one determined object is associated with the second map type and absent in the first map data; and
generating the second map data by rendering the at least one determined object onto the first map data.

17. The vehicle of claim 14, wherein the map adaptor adapts the first map data by:
processing the first sensor data and the first map data using a machine learning model to generate the second map data.

* * * * *